(12) United States Patent
Duan et al.

(10) Patent No.: US 9,963,029 B1
(45) Date of Patent: May 8, 2018

(54) HYBRID TRANSMISSION DEVICE

(71) Applicant: Guangzhou Sunmile Dynamic Technologies Corp., LTD, Guangzhou, Guangdong (CN)

(72) Inventors: Fuhai Duan, Fujian (CN); Yu Wang, Guangdong (CN); Jun Chen, Guangdong (CN)

(73) Assignee: Guangzhou Sunmile Dynamic Technologies Corp., Ltd, Guangzhou (CN)

( * ) Notice: Subject to any disclaimer, the term of this patent is extended or adjusted under 35 U.S.C. 154(b) by 0 days. days.

(21) Appl. No.: 15/719,623

(22) Filed: Sep. 29, 2017

(30) Foreign Application Priority Data

Oct. 21, 2016 (CN) .......................... 2016 1 0920932
Dec. 6, 2016 (CN) .......................... 2016 1 1113277
(Continued)

(51) Int. Cl.
*B60K 6/365* (2007.10)
*F16H 3/72* (2006.01)
*B60K 6/44* (2007.10)

(52) U.S. Cl.
CPC ................ *B60K 6/365* (2013.01); *B60K 6/44* (2013.01); *F16H 3/728* (2013.01);
(Continued)

(58) Field of Classification Search
CPC ............. F16H 3/728; F16H 2200/2017; F16H 2200/2051; B60K 6/365; B60K 6/44; Y10S 903/911
(Continued)

(56) References Cited

U.S. PATENT DOCUMENTS 4,420,992 A * 12/1983 Windish ................... F16H 3/66
475/118
6,491,599 B1 * 12/2002 Schmidt ................. B60K 6/365
475/18
(Continued)

FOREIGN PATENT DOCUMENTS

CN 104405834 A 3/2015
CN 105134893 A 12/2015
(Continued)

OTHER PUBLICATIONS

2nd Office Action of counterpart Chinese Patent Application No. 201610920932.7 dated Jun. 6, 2017.
(Continued)

*Primary Examiner* — Roger L Pang

(57) ABSTRACT

A hybrid transmission device includes six planetary gear sets mechanically-operatively connected to an internal combustion engine and two motor/generators adapted to selectively transmit mechanical power to an output member through selective application of eight caliper brake systems. Each planetary gear set has a sun gear and a ring gear, each of which meshingly engage a plurality of planet gears. The first and second motor/generators are coaxially aligned with each other as well as six planetary gear sets. The sun gear in the first planetary gear set is connected to the first motor/generator. The sun gear in the second planetary gear set is connected to the second motor/generator. Various driving modes are provided by changing the states of the caliper brake systems and the operating modes of the engine and the first and second motor/generators.

20 Claims, 6 Drawing Sheets

(30) Foreign Application Priority Data

| Jan. 6, 2017 | (CN) | .......................... 2017 1 0009987 |
| Jan. 13, 2017 | (CN) | .......................... 2017 1 0024899 |
| Jan. 13, 2017 | (CN) | .......................... 2017 1 0025192 |

(52) U.S. Cl.
  CPC ... *B60Y 2200/92* (2013.01); *F16H 2200/2017* (2013.01); *F16H 2200/2051* (2013.01); *Y10S 903/911* (2013.01)

(58) Field of Classification Search
  USPC ................................... 475/275–291, 5, 330
  See application file for complete search history.

(56) References Cited

U.S. PATENT DOCUMENTS

| 2005/0137050 | A1* | 6/2005 | Winzeler | .................. F16H 3/66 |
| | | | | 475/296 |
| 2008/0093137 | A1 | 4/2008 | Maeda et al. | |
| 2008/0312021 | A1* | 12/2008 | Oba | ....................... B60K 6/365 |
| | | | | 475/5 |
| 2014/0371021 | A1* | 12/2014 | Eo | ............................ F16H 3/66 |
| | | | | 475/269 |

FOREIGN PATENT DOCUMENTS

| CN | 106004410 A | 10/2016 |
| CN | 206106917 U | 4/2017 |
| WO | 2012025202 A1 | 3/2012 |

OTHER PUBLICATIONS

1st Office Action of counterpart Chinese Patent Application No. 201611113277.0 dated May 26, 2017.

1st Office Action of counterpart Chinese Patent Application No. 201710009987.7 dated Jun. 19, 2017.

1st Office Action of counterpart Chinese Patent Application No. 201710025192.5 dated Jun. 20, 2017.

* cited by examiner

HYBRID TRANSMISSION DEVICE

CROSS-REFERENCE TO RELATED PATENT APPLICATION

The present application claims the benefit of Chinese Patent Application No. 201610920932.7, filed on Oct. 21, 2016; Chinese Patent Application No. 201611113277.0, filed on Dec. 6, 2016; Chinese Patent Application No. 201710009987.7, filed on Jan. 6, 2017; Chinese Patent Application No. 201710025192.5, filed on Jan. 13, 2017; and Chinese Patent Application No. 201710024899.4, filed on Jan. 13, 2017, the disclosure of all of which are hereby incorporated by reference in their entirety.

FIELD OF THE INVENTION

The present invention relates generally to vehicular transmission. More particularly, the present invention relates to vehicular transmissions that receives input power from an engine as well as an electrical storage device. Specifically, the present invention relates to a hybrid transmission device that utilizes six planetary gear sets that are operatively connected to an engine and two motor/generators. The motor/generators are coaxially aligned with each other as well as the planetary gear sets. The planetary gear sets provide multi-modes, or speed change devices, that are selectively available, as by the utilization of eight caliper brake systems, to transmit power from the engine and/or motor/generators to the output member of the transmission, depending upon the desired, or required, power and/or speed to be delivered by the output member. The transmission provides various driving modes and four available fixed speed ratios.

BACKGROUND

The purpose of a vehicular transmission is to provide a neutral, one or more forward and reverse driving range that impart power from engine, and/or other power sources, to the drive members which deliver the tractive effort from the vehicle to terrain over which the vehicle is being driven. As such, the drive members may be front wheels or rear wheels.

Although a wide variety of transmission types are available, transmissions adapted to receive the output power from either an engine or an electric motor, or both, can be provided that will operate at high efficiencies over a wide variety of operating conditions. Fuel economy is critical in a hybrid electric vehicle. Spinning the planetary gear sets and wet clutch plates at all times consume energy due to friction losses, which negatively affects fuel economy. The transmission of a hybrid electric vehicle includes an engine, the first and second motor/generators and energy storage device, such as batteries, wherein the engine and motors can drive the wheels individually, the engine can charge the energy storage device through the electric machine operating as a generator, and vehicle kinetic energy can be recovered and regenerated using the wheel brakes to drive the generator and recharge the energy storage device. A control unit regulates power flow among the energy storage device and the motor/generators as well as between the first and second motor/generators.

The transmission for a hybrid electric vehicle, specifically, a plug-in hybrid electric vehicle, and the energy storage device is significantly increased in capacity so that electrical energy from the electric grid can be used of electric drive is expected. As a result, a much greater use of electric drive is expected. The transmissions adapted to receive the output power from either the first or second motor/generators, or both, would to be provided that will operate at high efficiencies over a wide variety of operating conditions. The direct connection of the first motor/generator to the engine shaft causes the first motor/generator shaft to rotate as the engine driving the wheels individually. The direct connection of the second motor/generator to the wheel speed causes the second motor/generator shaft to rotate as the vehicle moves when the engine is off. These cause several issues including (i) as the vehicle increases in speed in the engine mode, the first and second motor/generators speed get excessively high causing a durability concern for the bearing, planetary gear sets, the first and second motor/generators; (ii) Spinning the planetary gear sets and wet clutch plates at all times consume a lot of energy due to friction losses causing driving efficiency dropped dramatically; (iii) since the first and second motor/generators are not being used, them generate an unnecessary spin loss; (iv) lowering of available torque needed to start the engine; (v) the transmission is short of fixed ratios causing the inefficient operation of the engine and the motor/generators.

Various control schemes and operational connections between the various components of the hybrid electric system are known, and the control system must be able to engage and disengage the various components from the transmission in order to perform the functions of the hybrid electric system. Engagement and disengagement are known to be accomplished within the transmission by employing selectively operable clutches. Clutches are known in a variety of designs and control methods. One known type of clutch within the transmission is a mechanical clutch operating by separating or joining two connective surfaces, for instances, wet clutch plates, operating, when joined, to apply frictional torque to each other. Engagement operation while engaged operation, and disengagement operation while disengaged operation are all clutch states that must be managed in order for the vehicle to operate properly and smoothly. Therefore, slip, or relative rotational movement between the connective surfaces of the clutch when the clutch connective surfaces are intended to be synchronized and locked, occurs whenever reactive torque applied to the clutch exceeds actual capacity torque created by applied clamping force. These cause several issues including (i) slip in the transmission results in a lot of heat and dust causing degradation for the performance and life of the transmission; (ii) resistance force between two connective surfaces for wet clutch plates becomes larger as the input member speed becomes higher resulting in a large amount of heat and a decrease in efficiency for the transmission; (iii) the oil roads of clutches are very complex and precise resulting in a significant increase in costs; (iv) once the clutches are damaged, the transmission must be disassembled for repair or replacement; (v) lubricating oil selection for the transmission must take into account clutch performance and transmission life, such as gears and bearings, it is difficult to give full play to the best performance of lubricating oil.

SUMMARY

A primary aspect of the present invention provides a new and novel transmission configuration that is particularly suited to be made and assembled in modules. The hybrid transmission device is particularly useful in buses and trucks. The transmission uses six planetary gear sets and eight caliper brake systems and provides various driving modes. It enables maximum power to be reached more quickly for passing, towing and hauling, and enables the use of smaller electrical components with high power engines which may be cost-effectively implemented into buses and trucks. By providing four fixed speed ratios in an electrically variable transmission, maximum fuel and electricity economy is achieved at a reasonable cost.

It is, therefore, a primary object of the present invention to provide a novel hybrid transmission device that provides caliper brake systems to achieve maximum power quickly for passing, towing and hauling in a bus or truck, while providing four fixed speed ratios.

It is another object of the present invention to provide a novel hybrid transmission device, as above, wherein the planetary gear sets and the motor/generators are coaxially disposed.

It is a further object of the present invention to provide a novel transmission, as above, wherein the first and second motor/generators rotors are locked when the engine drives the vehicle individually.

It is still another object of the present invention to provide a novel hybrid transmission device, as above, wherein the operational results can be achieved with six planetary gear sets.

It is still further object of the present invention to provide a novel hybrid transmission device, as above, wherein the caliper brake systems are installed outside the transmission housing and the motor/generators housings.

It is an even further object of the present invention to provide a novel hybrid transmission device, as above, wherein the transmission is operated by eight caliper brake systems.

These and other objects of the present invention, as well as the advantages thereof over existing and prior art forms, which will be apparent in view of the following detailed specification, are accomplished by means hereinafter described and claimed.

By way of a general introductory description, a hybrid transmission device embodying the concepts of the present invention utilizes an input member for receiving power from a prime mover power source and an output member for delivering power from the transmission. First and second motor/generators are operatively connected to an energy storage device for interchanging electrical power between the storage device and the first and second motor/generators. A control unit is provided for regulating the electrical power interchange between the energy storage device and the first and second motor/generators.

The subject transmission employs six planetary gear sets which are coaxially aligned. Each planetary gear set has a sun gear and a ring gear, each of which meshingly engage a plurality of planet gears.

The first and second motor/generators are coaxially aligned with each other as well as six planetary gear sets. The sun gear in the first planetary gear set is connected to the first motor/generator. The sun gear in the second planetary gear set is connected to the second motor/generator. The carrier in the first planetary gear set is connected to the engine. The carrier in the second planetary gear set is connected to the sun gears in the third and fourth planetary gear sets. The carrier in the sixth planetary gear set is connected to the output member of the transmission.

The caliper brake system is fixed caliper architecture, comprises a dry disc, the speed sensors for watching state of the dry disc, the left pad plate, the right pad plate, two pairs of independent hydraulic pistons as well as the calipers. The caliper disc brake system, the left pad plate and the right pad plate are pressed against the dry disc by two pairs of independent hydraulic pistons inside the calipers, respectively, connected in parallel to the same pressure source from the hydraulic actuator cylinder by using a hydraulic circuit. The calipers and the dry disc are mounted on outside of the transmission housing.

The ring gear in the first planetary gear set is connected with the ring gear in the second planetary gear set by a first gear. The carrier in the third planetary gear set is connected with the ring gear in the fourth planetary gear set. The ring gear in the fifth planetary gear set is connected with the ring gear in the sixth planetary gear set by a third gear and the carrier in the third planetary gear set is connected with the sun gear in the sixth planetary gear set.

Two E1 shift gears are symmetrically arranged on the outer circumference of the first gear, and the two E1 shift gears are simultaneously engaged with the first gear. The E1 shift gear is fixedly connected with an E1 brake disc by an E1 gear shift.

Two T1 shift gears are symmetrically arranged on the outer circumference of the ring gear in the third planetary gear set, and the two T1 shift gears are simultaneously engaged with the ring gear in the third planetary gear set. The T1 shift gear is fixedly connected with a T1 brake disc by a T1 gear shift.

Two T2 shift gears are symmetrically arranged on the outer circumference of the ring gear in fourth planetary gear set, and the two T1 shift gears are simultaneously engaged with the ring gear in fourth planetary gear set. The T2 shift gear is fixedly connected with a T2 brake disc by a T2 gear shift.

Two T3 shift gears are symmetrically arranged on the outer circumference of the second gear, and the two T3 shift gears are simultaneously engaged with the second gear. The T3 shift gear is fixedly connected with a T3 brake disc by a T3 gear shift.

Two T4 shift gears are symmetrically arranged on the outer circumference of the third gear, and the two T4 shift gears are simultaneously engaged with the third gear. The T4 shift gear is fixedly connected with a T4 brake disc by a T4 gear shift.

The M1 brake disc is fixedly connected with the first motor/generator shaft. The M2 brake disc is fixedly connected with the second motor/generator shaft. The E0 brake disc is fixedly connected with the input member of the transmission.

To acquaint persons skilled in the arts most closely related to the present invention, one highly preferred alternative embodiment of a hybrid transmission device that illustrate the best modes now contemplated for putting the invention into practice are described herein by, and with reference to, the annexed drawings that form a part of the specification. The exemplary transmission is described in detail without attempting to show all of the various forms and modification in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DETAILED DESCRIPTION

Figure 1:
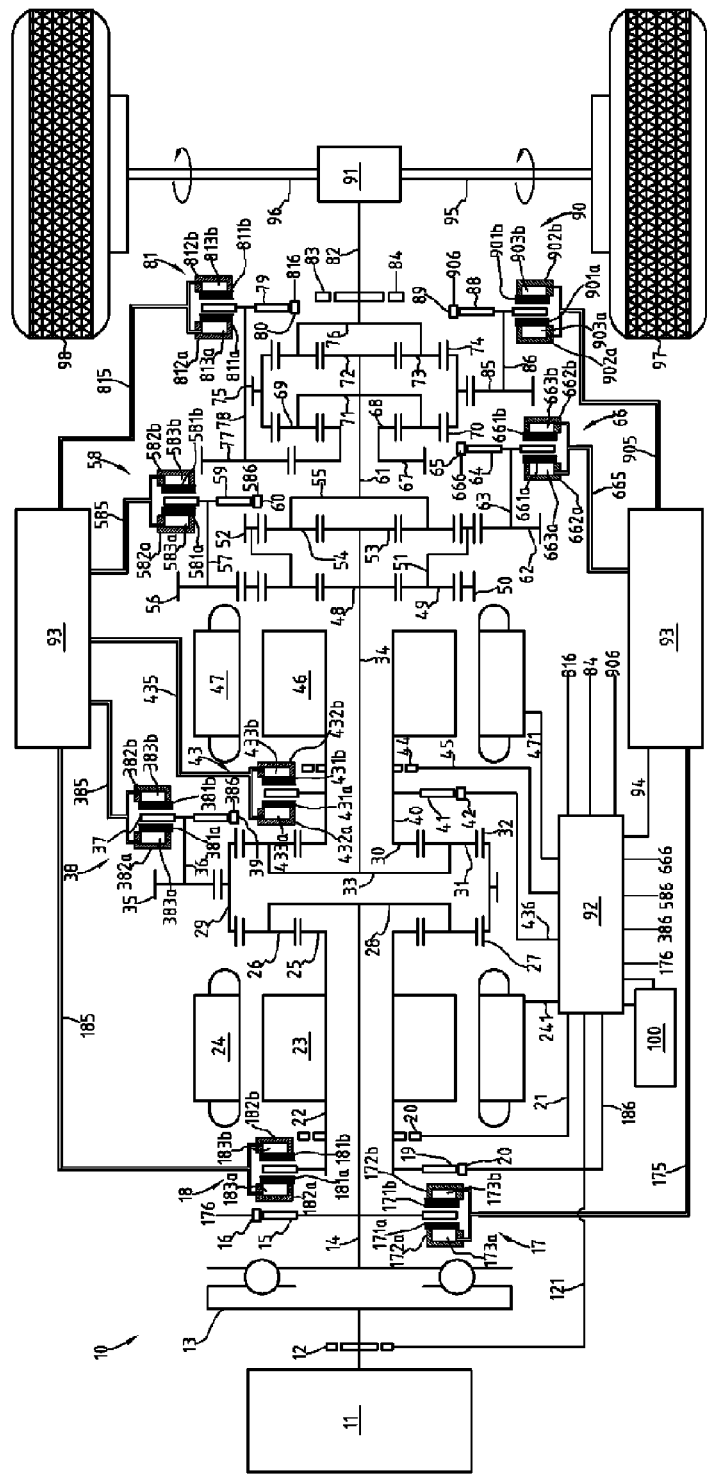
FIG. 1 is a schematic representation of the hybrid transmission device.
Figure 2:
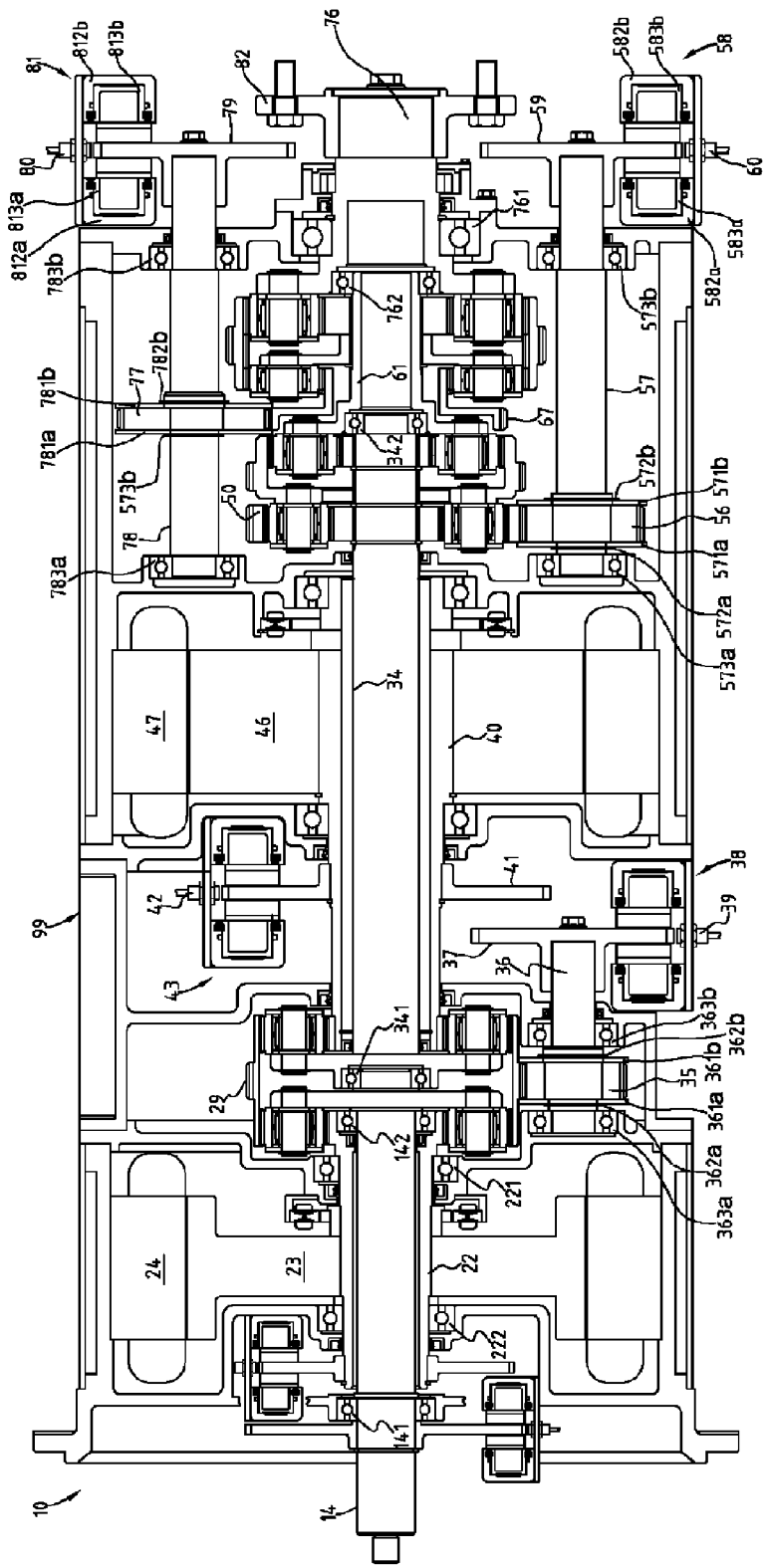
FIG. 2 is a diagrammatic, longitudinal cross section view of a hybrid transmission device according to a representative preferred embodiment of the invention depicted in FIG. 1.
Figure 3:
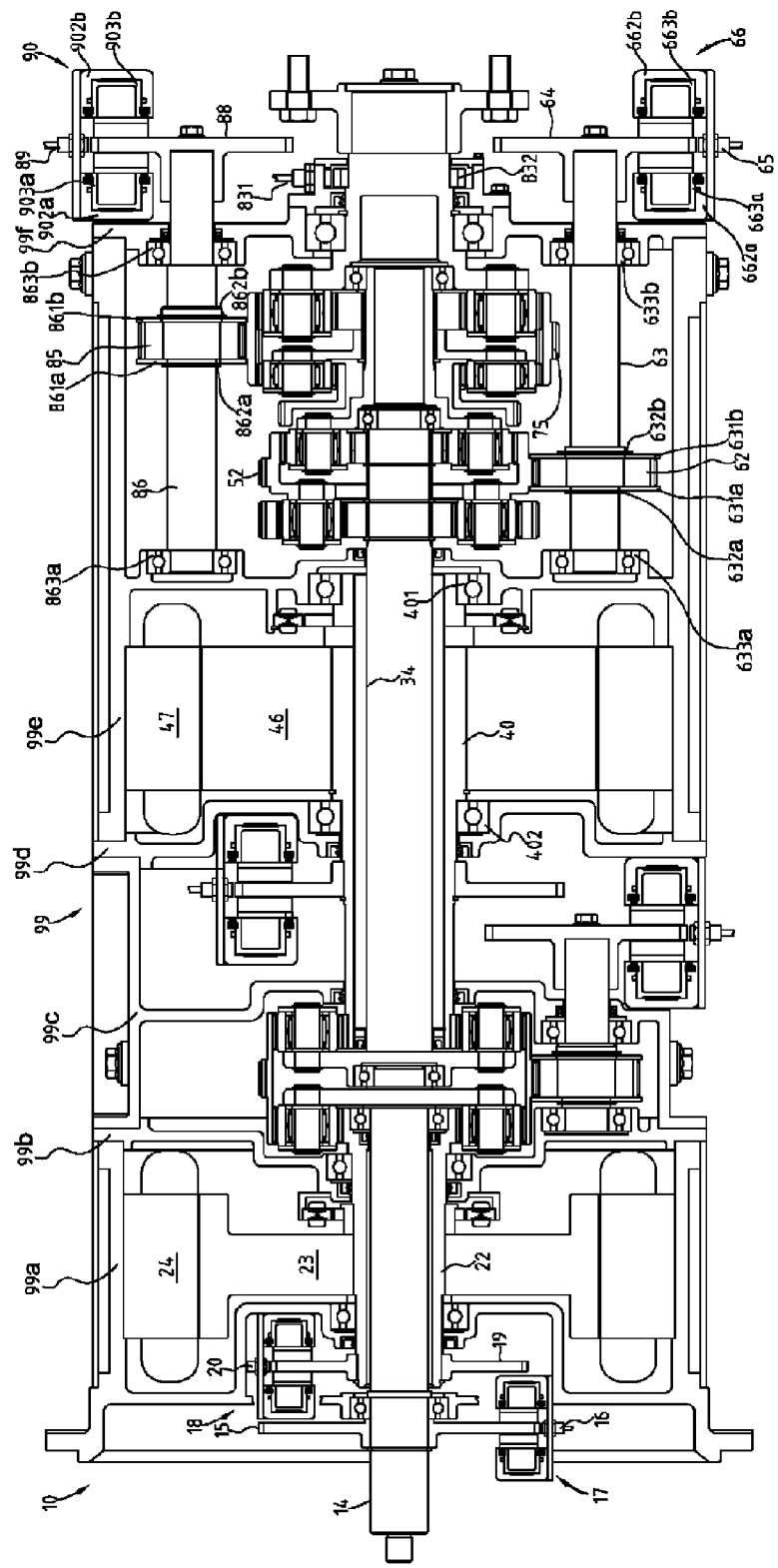
FIG. 3 is a diagrammatic, longitudinal cross section view of a hybrid transmission device according to a representative preferred embodiment of the invention depicted in FIG. 1.

As shown in FIG. 3, one representative form of a hybrid transmission device with four fixed speed ratios that can be readily assembled in conformity with the concepts of the present invention is designated generally by the numeral 10 on the accompanying drawings, and that preferred form of the hybrid transmission device is depicted in FIGS. 1 through 6, inclusive. With particular reference, then, to those figures it will be observed that the hybrid transmission device 10 is constructed to permit a unique modular assembly. That is, an over-all housing 99 is comprised of four modules. A first module is a first generally annular central portion that is provided with a first housing 99a and a first stanchion plate 99b. A first motor/generator is installed in the first central portion. A second modular is a second generally annular central portion that is provided with the first stanchion plate 99b and a second housing 99c. A first and second planetary gear sets are installed in the second central portion. A third modular is a third generally annular central portion that is provided with a second stanchion plate 99d and a third housing 99e. A second motor/generator is installed in the third central portion. A fourth modular is a fourth generally annular central portion that is provided with a third housing 99e and a third stanchion plate 99f. A third, fourth, fifth and sixth planetary gear sets are installed in the fourth central portion.

As shown in FIGS. 1 and 2, the hybrid transmission device 10 has an input member 14 that may be in the nature of shaft which may be directly driven by an engine 11. A transient torque damper 13 may be incorporated between the output shaft of the engine 11 and the input member 14 of the hybrid transmission device 10. In the embodiment depicted the engine 11 may be a fossil fuel engine, such as a diesel engine which is readily adapted to provide its available power output delivered. Irrespective of the means by which the engine 11 is connected to the input member 14 of the hybrid transmission device 10, the input member 14 is connected to a first carrier 28 in a first planetary gear set P1 in the hybrid transmission device 10. One end of a first motor/generator shaft 22 is connected with a first sun gear 25, the other end is fixedly connected with a M1 dry disc 19, and a first motor rotor 23 is fixedly secured to the middle. The first motor/generator rotor shaft 22 is hollow allowing the input member 14 to pass through its center from the first planetary gear P1 to the first carrier 28. The input member 14 has two collars, the shaft end of which engage the inner cages of a first bearing 141 and a second bearing 142, respectively. A second carrier 33 has one buttressed annular hub that is partitioned, to receive outer cage of the second bearing 142. An E0 dry disc 15 is fixedly secured to the front end of the input member 14.

Figure 4:
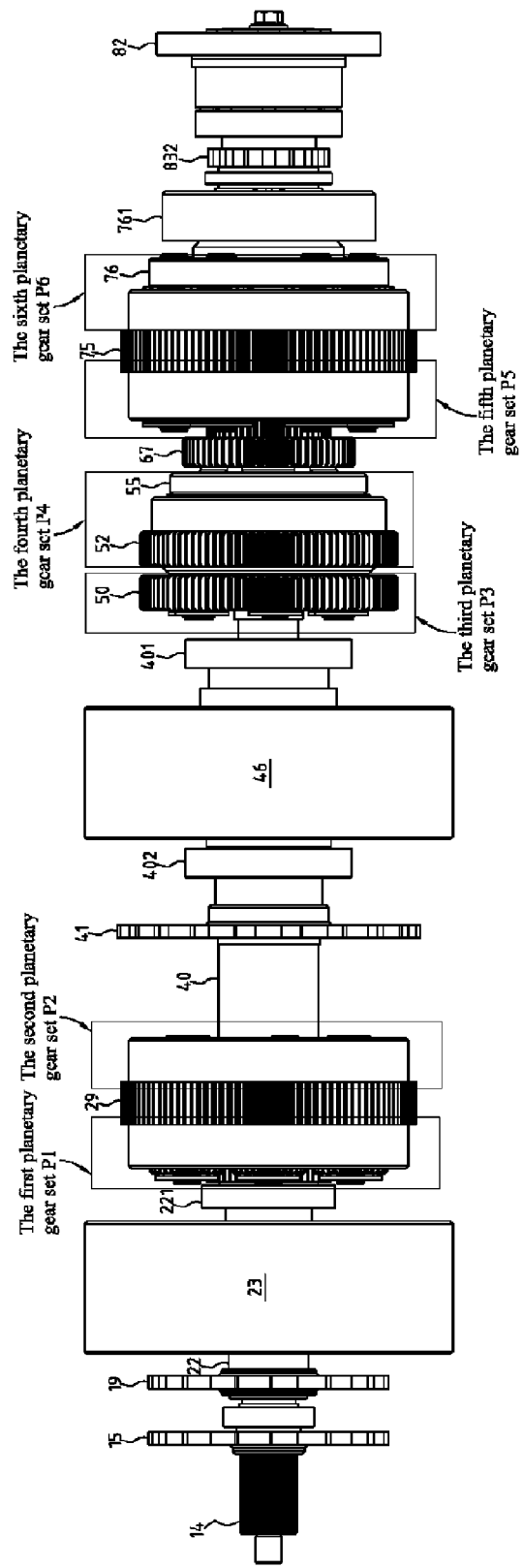
FIG. 4 is a partial sectional view showing the motor/generators rotors and the planetary gear sets in FIG. 1, FIG. 2 and FIG. 3.

As shown in FIGS. 1 and 4, the hybrid transmission device 10 utilizes six compound planetary gear sets P1, P2, P3, P4, P5 and P6. The first planetary gear set P1 has a first outer gear member 27, which may generally be designated as the first ring gear 27, which circumscribes an first inner gear member 25, generally designated as the first sun gear 25. A plurality of first planet gear members 26 are rotatably mounted on the first carrier 28 such that each first planet gear 26 meshingly engages both the first ring gear 27 and the first sun gear 25.

The second planetary gear set P2 has a second outer gear member 32, which may generally be designated as the second ring gear 32, which circumscribes an second inner gear member 30, generally designated as the second sun gear 30. A plurality of second planet gear members 31 are rotatably mounted on a second carrier 33 such that each second planet gear 31 meshingly engages both the second ring gear 32 and the second sun gear 30.

In the first and second planetary gear sets embodiment, the first ring gear 27 is connected to the second ring gear 32 by a first gear 29. The first gear 29 has an outer tooth structure, which is mounted on the outer circumference of the whole ring formed by the first ring gear 27 and the second ring gear 32. A differential compound planetary gear set is comprised of the first planetary gear set P1 and the second planetary gear set P2.

Figure 5:
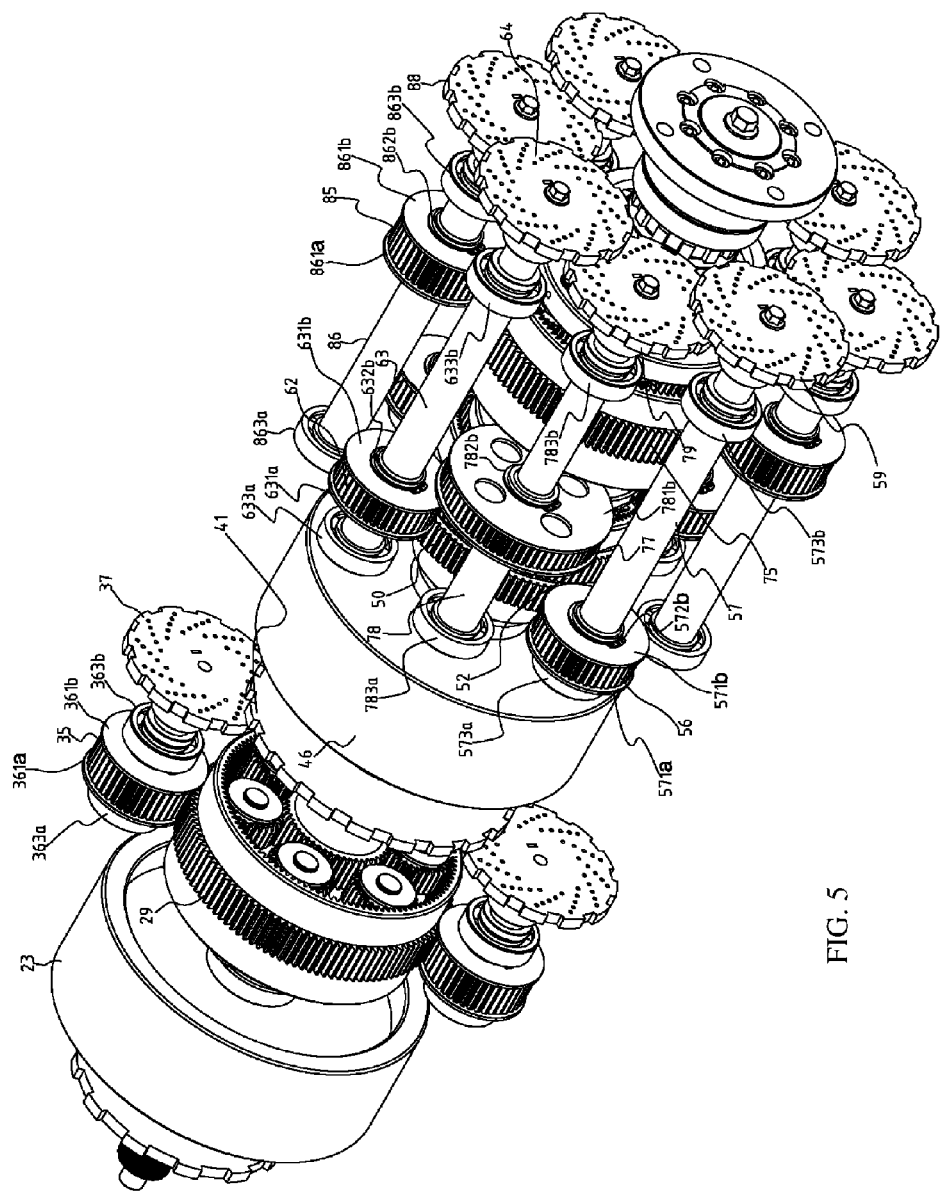
FIG. 5 is a partial sectional view showing the brake discs, the planetary gear sets and the shift gears in FIG. 1, FIG. 2 and FIG. 3.
Figure 6:
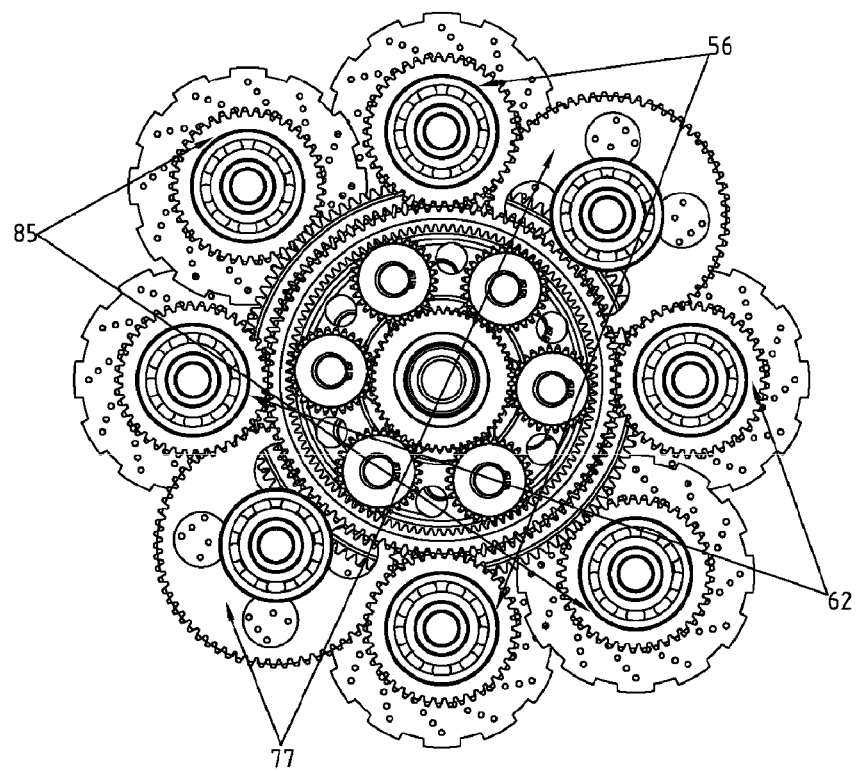
FIG. 6 is a partial sectional view showing the shift gears in FIG. 1, FIG. 2 and FIG. 3.

As shown in FIGS. 1, 2 and 5, there are two symmetrically arranged the E1 shift gear systems. The E1 shift gear systems comprise an E1 gear 35 which meshingly engages the first gear 29, a E1 shift gear shaft 36 which is fixedly secured to an E1 dry disc 37, an E1 left bearing 363a, an E1 right bearing 363b, an E1 left spacing ring 361a and an E1 right spacing ring 361b which is fixed to the E1 gear shaft 36 by a left shaft circlip 362a and a right shaft circlip 362b. Therefore, the first gear 29 is positioned in the axial direction by the spacing rings 361a and 361b. The stanchion plate 99b and the housing 99c have two annular hubs in the direction of circumferential symmetry, which are partitioned to receive outer cages of four bearings 363a and 363b.

With particular reference to FIGS. 1 to 3, it will be observed that the first motor/generator has a first stator 24 and a first rotor 23. Similarly, the second motor/generator has a second stator 47 and a second rotor 46. The first motor/generator stator 24 is fixedly secured to a generally cylindrical, interior surface of the central housing portion 99a. The second motor/generator stator 47 is fixedly secured to a generally cylindrical, interior surface of the central housing portion 99e.

The first stanchion plate 99b extends from the end of the central housing portion 99a near the engine 11 to terminate in two buttressed annular hubs that are partitioned, to receive outer cages of a third bearing 222 and the first bearing 141, respectively. In addition, the stanchion plate of the central housing portion 99a is used to connect with the engine 11. The first stanchion plate 99b has a buttressed annular hub that is partitioned to receive outer cage of a forth bearing 221. The first motor/generator rotor shaft 22 has two collars the shaft end of which engage the inner cages of the forth bearing 221 and third 222, respectively.

The second stanchion plate 99d extends radially inwardly from the medial portion of the interior surface in the central housing portion 99e that is partitioned to receive outer cage of a fifth bearing 401. The second stanchion plate 99d has also a buttressed annular hub that is partitioned to receive outer cage of a sixth bearing 402. The second motor/generator rotor shaft 40 has two collars the shaft end of which engage the inner cages of the fifth bearing 401 and sixth bearing 402, respectively. The second motor/generator rotor shaft 40 is hollow allowing an input shaft 34 to pass through its center from the second planetary gear P2 to the second carrier 33. One end of the second motor/generator shaft 40 is connected with the second sun gear 30, the other end is fixedly connected with the second motor/generator rotor 46, and a M2 dry disc 41 is fixedly secured to the middle.

The third planetary gear set P3 has an third outer gear member 50, which may generally be designated as the third ring gear 50, which circumscribes an third inner gear member 48, generally designated as the third sun gear 48. A plurality of third planet gear members 49 are rotatably mounted on a third carrier 51 such that each third planet gear 49 meshingly engages both the third ring gear 50 and the third sun gear 48. The third ring gear 50 has both the internal and external teeth.

As shown in FIGS. 1 to 6, there are two symmetrically arranged the T1 shift gear systems. The T1 shift gear system comprises a T1 gear 56 which meshingly engages the outer gear teeth of the third ring gear 50, a T1 shift gear shaft 57 which is fixedly secured to a T1 dry disc 59, a T1 left bearing 573a, a T1 right bearing 573b, a T1 left spacing ring 571a and a T1 right spacing ring 571b which is fixed to a T1 gear shaft 57 by a left shaft circlip 572a and a right shaft circlip 572b. Therefore, the third ring gear 50 is positioned in the axial direction by the spacing rings 571a and 571b.

The fourth planetary gear set P4 has an fourth outer gear member 52, which may generally be designated as the fourth ring gear 52, which circumscribes an fourth inner gear member 53, generally designated as the fourth sun gear 53. A plurality of fourth planet gear members 54 are rotatably mounted on a fourth carrier 55 such that each fourth planet gear 54 meshingly engages both the fourth ring gear 52 and the fourth sun gear 53. The fourth ring gear 52 has both the internal and external teeth.

There are two symmetrically arranged T2 shift gear systems. The T2 shift gear system comprises a T2 gear 62 which meshingly engages the outer gear teeth of the fourth ring gear 52, a T2 shift gear shaft 63 which is fixedly secured to a T2 dry disc 64, a T2 left bearing 633a, a T1 right bearing 633b, a T2 left spacing ring 631a and a T2 right spacing ring 631b which is fixed to the T2 gear shaft 63 by a left shaft circlip 632a and a right shaft circlip 632b. Therefore, the third ring gear 52 is positioned in the axial direction by the T2 left spacing rings 631a and T2 right 631b.

The input shaft 34 is simultaneously connected with the third sun gear 48 and the fourth sun gear 53. The input shaft 34 is fixedly secured to the second carrier 33 which has one buttressed annular hub that is partitioned, to receive outer cage of a seventh bearing 341. The fourth carrier 55 has one buttressed annular hub that is partitioned, to receive outer cage of a eighth bearing 342. The first carrier 28 has one collar the end of which engages the inner cage of the seventh bearing 341. In the third and fourth planetary gear sets embodiment, the third carrier 51 is connected to the fourth ring gear 52.

The fifth planetary gear set P5 has an fifth outer gear member 70, which may generally be designated as the fifth ring gear 70, which circumscribes an inner gear member 68, generally designated as the fifth sun gear 68. A plurality of fifth planet gear members 69 are rotatably mounted on a fifth carrier 71 such that each fifth planet gear member 69 meshingly engages both the fifth ring gear 70 and the fifth sun gear 68.

The fifth sun gear 68 is fixedly connected to a second gear 67 that has only the external teeth. There are two symmetrically arranged the T3 shift gear systems. The T3 shift gear systems comprise a T3 gear 77 which meshingly engages the second gear 67, a T3 shift gear shaft 78 which is fixedly secured to the T3 dry disc 79, a T3 left bearing 783a, a T3 right bearing 783b, a T3 left spacing ring 781a and a T3 right spacing ring 781b which is fixed to the T3 gear shaft 78 by a left shaft circlip 782a and a right shaft circlip 782b. Therefore, the second gear 67 is positioned in the axial direction by the spacing rings 781a and 781b.

The sixth planetary gear set P6 has an sixth outer gear member 74, which may generally be designated as the sixth ring gear 74, which circumscribes an inner gear member 72, generally designated as the sixth sun gear 72. A plurality of sixth planet gear members 73 are rotatably mounted on a sixth carrier 76 such that each sixth planet gear member 73 meshingly engages both the sixth ring gear 74 and the sixth sun gear 72.

In the fifth and sixth planetary gear sets embodiment, the fifth ring gear 70 is connected to the sixth ring gear 74 by a third gear 75. The third gear 75 has an outer tooth structure, which is mounted on the outer circumference of the whole ring formed by the fifth ring gear 70 and the sixth ring gear 74. There are two symmetrically arranged the T4 shift gear systems. The T4 shift gear systems comprise a T4 gear 85 which meshingly engages the third gear 75, a T4 shift gear shaft 86 which is fixedly secured to a T4 dry disc 88, a T4 left bearing 863a, a T4 right bearing 863b, a T4 left spacing ring 861a and a T4 right spacing ring 861b which is fixed to the T4 shift gear shaft 86 by a left shaft circlip 862a and a right shaft circlip 862b. Therefore, the third gear 75 is positioned in the axial direction by the spacing rings 861a and 861b.

The third housing 99e and the third stanchion plate 99f have eight annular hubs in the direction of circumferential symmetry, which are partitioned to receive outer cages of sixteen bearings 573a, 573b, 633a, 633b, 783a, 783b, 863a and 863b.

The second gear 67 and the fifth sun gear 68 are hollow allowing a middle shaft 61 to pass through its center from the fourth planetary gear set P4 to the fifth and sixth planetary gear sets P5 and P6. The fourth carrier 55 is connected to the fifth carrier 71 and the sixth sun gear 72 through the middle shaft 61. The sixth carrier 76 in the sixth planetary gear set is connected directly to the a vehicular axle 82. The third stanchion plate 99f has a buttressed annular hub that is partitioned to receive outer cage of a ninth bearing 761. The sixth carrier 76 has a collar the shaft right end of which engages the inner cage of the ninth bearing 761. The sixth carrier 76 has also a buttressed annular hub that is partitioned to receive outer cage of a tenth bearing 762. The middle shaft 61 has a collar, and the right end of the middle shaft 61 engages the inner cage of the bearing 762. The vehicular axle 82 drives a differential assembly 91 to transmit the power to two side shafts 95, 96 and two wheels 97, 98.

An electrical control unit (ECU) 92 of the hybrid transmission device 10 communicates a MG1 speed sensor 20 by a first transfer conductor 21, an En speed sensor 12 by a second transfer conductor 121 and a MG2 speed sensor 44 by a third transfer conductor 45. The ECU 92 also communicates an E0 speed sensor 16 by a fourth transfer conductor 176, a M1 speed sensor 20 by a fifth transfer conductor 186, an E1 speed sensor 39 by a sixth transfer conductor 386, a M2 speed sensor 42 by a seventh transfer conductor 436, a T1 speed sensor 60 by a eighth transfer conductor 586, a T2 speed sensor 65 by a ninth transfer conductor 666, a T3 speed sensor 80 by a tenth transfer conductor 816 and a T4 speed sensor 89 by a eleventh transfer conductor 906, respectively. A hydraulic control unit (HCU) 93 communicates with the ECU 92 by a twelfth transfer conductor 94.

The HCU 93 communicates with an E0 caliper brake system 17 by a first hydraulic circuit 175, a M1 caliper brake system 18 by a second hydraulic circuit 185, an E1 caliper brake system 38 by a third hydraulic circuit 385, a M2 caliper brake system 43 by a fourth hydraulic circuit 435, a T1 caliper brake system 58 by a fifth hydraulic circuit 585, a T2 caliper brake system 66 by a sixth hydraulic circuit 665, a T3 caliper brake system 81 by a seventh hydraulic circuit 815 and a T4 caliper brake system 90 by a eighth hydraulic circuit 905, respectively.

The E0 caliper brake system 17 is a fixed caliper architectures, comprises the E0 dry disc 15, the E0 speed sensor 16 for watching state of the E0 dry disc 15, an E0 left pad plate 171*a*, an E0 right pad plate 171*b*, two pairs of independent hydraulic pistons 173*a* and 173*b* as well as an E0 calipers 172*a* and 172*b*. A plurality of speed teeth are uniformly processed on the circumferential surface of the E0 dry disc 15. There is a clearance about 2 mm between the E0 speed sensor 16 and the circumferential surface of the E0 dry disc 15. The E0 caliper brake system 17, as shown in FIGS. 1 to 3, the E0 left pad plate 171*a* and the E0 right pad plate 171*b* are pressed against the E0 dry disc 15 by two pairs of independent hydraulic piston 173*a* and 173*b* inside the E0 calipers 172*a* and 172*b*, respectively, connected in parallel to the same pressure source from the HCU 93 by using the first hydraulic circuit 175. There is a clearance about 0.2 mm between the E0 pad plates 171*a*, 171*b* and the E0 dry disc 15. The E0 calipers 172*a* and 172*b* are fixedly secured to outside surface of the first stanchion plate 99*b* of the central housing portion 99*a* by fastening bolts. As the E0 pistons 173*a* and 173*b* are pulled away from the E0 dry disc 15 by the elastic force from the sealing ring, there are no friction between the E0 pad plates 171*a*, 171*b* and the E0 dry disc 15. The high pressure oil from HCU 93 feeds into the cavities formed between the E0 hydraulic pistons 173*a*, 173*b* and the E0 calipers 172*a*, 172*b* through the first hydraulic circuit 175. The E0 hydraulic pistons 173*a*, 173*b* are operated by the fluid pressure, which drives the E0 pad plates 171*a*, 171*b* to fix the E0 dry disc 15.

The M1 caliper brake system 18 is a fixed caliper architectures, comprises a M1 dry disc 19, the MG1 speed sensor 20 for watching state of the M1 dry disc 19, a M1 left pad plate 181*a*, a M1 right pad plate 181*b*, two pairs of independent hydraulic pistons 183*a* and 183*b* as well as a M1 calipers 182*a* and 182*b*. A plurality of speed teeth are uniformly processed on the circumferential surface of the M1 dry disc 19. There is a clearance about 2 mm between the MG1 speed sensor 20 and the circumferential surface of the M1 dry disc 19. The M1 caliper brake system 18, as shown in FIGS. 1 to 3, the M1 left pad plate 181*a* and the M1 right pad plate 181*b* are pressed against the M1 dry disc 19 by two pairs of independent hydraulic piston 183*a* and 183*b* inside the M1 calipers 182*a* and 182*b*, respectively, connected in parallel to the same pressure source from the HCU 93 by using the second hydraulic circuit 185. There is a clearance about 0.2 mm between the M1 pad plates 181*a*, 181*b* and the M1 dry disc 19. The M1 calipers 182*a* and 182*b* are also fixedly secured to outside surface of the first stanchion plate 99*b* of the central housing portion 99*a* by fastening bolts. As the M1 pistons 183*a* and 183*b* are pulled away from the M1 dry disc 19 by the elastic force from the sealing ring, there are no friction between the M1 pad plates 181*a*, 181*b* and the M1 dry disc 19. The high pressure oil from HCU 93 feeds into the cavities formed between the M1 hydraulic pistons 183*a*, 183*b* and the M1 calipers 182*a*, 182*b* through the second hydraulic circuit 185. The M1 hydraulic pistons 183*a*, 183*b* are operated by the fluid pressure, which drives the M1 pad plates 181*a*, 181*b* to fix the M1 dry disc 19.

There are two symmetrically arranged the E1 caliper brake systems 38. The E1 caliper brake systems 38 comprises an E1 dry disc 37, the E1 speed sensor 39 for watching state of the E1 dry disc 37, an E1 left pad plate 381*a*, an E1 right pad plate 381*b*, two pairs of independent hydraulic pistons 383*a* and 383*b* as well as an E1 calipers 382*a* and 382*b*. A plurality of speed teeth are uniformly processed on the circumferential surface of the E1 dry disc 37. There is a clearance about 2 mm between the E1 speed sensor 39 and the circumferential surface of the E1 dry disc 37. The E1 caliper brake system 38, as shown in FIGS. 1 to 3, the E1 left pad plate 381*a* and the E1 right pad plate 381*b* are pressed against the E1 dry disc 37 by two pairs of independent hydraulic piston 383*a* and 383*b* inside the E1 calipers 382*a* and 382*b*, respectively, connected in parallel to the same pressure source from the HCU 93 by using the third hydraulic circuit 385. There is a clearance about 0.2 mm between the E1 pad plates 381*a*, 381*b* and the E1 dry disc 37. The E1 calipers 382*a* and 382*b* are fixedly secured to outside surface of the stanchion plate 99*b* by fastening bolts. As the E1 pistons 383*a* and 383*b* are pulled away from the E1 dry disc 37 by the elastic force from the sealing ring, there are no friction between the E1 pad plates 381*a*, 381*b* and the E1 dry disc 37. The high pressure oil from HCU 93 feeds into the cavities formed between the E1 hydraulic pistons 383*a*, 383*b* and the E1 calipers 382*a*, 382*b* through the third hydraulic circuit 385. The E1 hydraulic pistons 383*a*, 383*b* are operated by the fluid pressure, which drives the E1 pad plates 381*a*, 381*b* to fix the E1 dry disc 37.

The M2 caliper brake system 43 is a fixed caliper architectures, comprises a M2 dry disc 41, the M2 speed sensor 42 for watching state of the M2 dry disc 41, a M2 left pad plate 431*a*, a M2 right pad plate 431*b*, two pairs of independent hydraulic pistons 433*a* and 433*b* as well as a M2 calipers 432*a* and 432*b*. A plurality of speed teeth are uniformly processed on the circumferential surface of the M2 dry disc 41. There is a clearance about 2 mm between the M2 speed sensor 42 and the circumferential surface of the M2 dry disc 41. The M2 caliper brake system 43, as shown in FIGS. 1 to 3, the M2 left pad plate 431*a* and the M2 right pad plate 431*b* are pressed against the M2 dry disc 41 by two pairs of independent hydraulic piston 433*a* and 433*b* inside the M2 calipers 432*a* and 432*b*, respectively, connected in parallel to the same pressure source from the HCU 93 by using the fourth hydraulic circuit 435. There is a clearance about 0.2 mm between the M2 pad plates 431*a*, 431*b* and the M2 dry disc 41. The M2 calipers 432*a* and 432*b* are also fixedly secured to outside surface of the stanchion plate 99*b* by fastening bolts. As the M2 pistons 433*a* and 433*b* are pulled away from the M2 dry disc 41 by the elastic force from the sealing ring, there are no friction between the M2 pad plates 431*a*, 431*b* and the M2 dry disc 41. The high pressure oil from HCU 93 feeds into the cavities formed between the M2 hydraulic pistons 433*a*, 433*b* and the M2 calipers 432*a*, 432*b* through the fourth hydraulic circuit 435. The M2 hydraulic pistons 433*a*, 433*b* are operated by the fluid pressure, which drives the M2 pad plates 431*a*, 431*b* to fix the M2 dry disc 41.

There are two symmetrically arranged the T1 caliper brake systems 58. The T1 caliper brake systems 58 comprises a T1 dry disc 59, the T1 speed sensor 60 for watching state of the T1 dry disc 59, a T1 left pad plate 581*a*, a T1 right pad plate 581*b*, two pairs of independent hydraulic pistons 583*a* and 583*b* as well as a T1 calipers 582*a* and 582b. A plurality of speed teeth are uniformly processed on the circumferential surface of the T1 dry disc 59. There is a clearance about 2 mm between the T1 speed sensor 60 and the circumferential surface of the T1 dry disc 59. The T1 caliper brake system 58, as shown in FIGS. 1 to 3, the T1 left pad plate 581a and the T1 right pad plate 581b are pressed against the T1 dry disc 59 by two pairs of independent hydraulic piston 583a and 583b inside the T1 calipers 582a and 582b, respectively, connected in parallel to the same pressure source from the HCU 93 by using the fifth hydraulic circuit 585. There is a clearance about 0.2 mm between the T1 pad plates 581a, 581b and the T1 dry disc 59. The T1 calipers 582a and 582b are fixedly secured to outside surface of the stanchion plate 99f by fastening bolts. As the T1 pistons 583a and 583b are pulled away from the T1 dry disc 59 by the elastic force from the sealing ring, there are no friction between the T1 pad plates 581a, 581b and the T1 dry disc 59. The high pressure oil from HCU 93 feeds into the cavities formed between the T1 hydraulic pistons 583a, 583b and the T1 calipers 582a, 582b through the fifth hydraulic circuit 585. The T1 hydraulic pistons 583a, 583b are operated by the fluid pressure, which drives the T1 pad plates 581a, 581b to fix the T1 dry disc 59.

There are two symmetrically arranged the T2 caliper brake systems 66. The T2 caliper brake systems 66 comprises a T2 dry disc 64, the T2 speed sensor 65 for watching state of the T2 dry disc 64, a T2 left pad plate 661a, a T2 right pad plate 661b, two pairs of independent hydraulic pistons 663a and 663b as well as a T2 calipers 662a and 662b. A plurality of speed teeth are uniformly processed on the circumferential surface of the T2 dry disc 59. There is a clearance about 2 mm between the T2 speed sensor 65 and the circumferential surface of the T2 dry disc 64. The T2 caliper brake system 66, as shown in FIGS. 1 to 3, the T2 left pad plate 661a and the T2 right pad plate 661b are pressed against the T2 dry disc 64 by two pairs of independent hydraulic piston 663a and 663b inside the T2 calipers 662a and 662b, respectively, connected in parallel to the same pressure source from the HCU 93 by using the sixth hydraulic circuit 665. There is a clearance about 0.2 mm between the T2 pad plates 661a, 661b and the T2 dry disc 64. The T2 calipers 662a and 662b are also fixedly secured to outside surface of the stanchion plate 99f by fastening bolts. As the T2 pistons 663a and 663b are pulled away from the T2 dry disc 64 by the elastic force from the sealing ring, there are no friction between the T2 pad plates 661a, 661b and the T2 dry disc 64. The high pressure oil from HCU 93 feeds into the cavities formed between the T2 hydraulic pistons 663a, 663b and the T2 calipers 662a, 662b through the sixth hydraulic circuit 665. The T2 hydraulic pistons 663a, 663b are operated by the fluid pressure, which drives the T2 pad plates 661a, 661b to fix the T2 dry disc 64.

There are two symmetrically arranged the T3 caliper brake systems 81. The T3 caliper brake systems 81 comprises a T3 dry disc 79, the T3 speed sensor 80 for watching state of the T3 dry disc 79, a T3 left pad plate 811a, a T3 right pad plate 811b, two pairs of independent hydraulic pistons 813a and 813b as well as a T3 calipers 812a and 812b. A plurality of speed teeth are uniformly processed on the circumferential surface of the T3 dry disc 79. There is a clearance about 2 mm between the T3 speed sensor 80 and the circumferential surface of the T3 dry disc 79. The T3 caliper brake system 81, as shown in FIGS. 1 to 3, the T3 left pad plate 811a and the T3 right pad plate 811b are pressed against the T3 dry disc 79 by two pairs of independent hydraulic piston 813a and 813b inside the T3 calipers 812a and 812b, respectively, connected in parallel to the same pressure source from the HCU 93 by using the seventh hydraulic circuit 815. There is a clearance about 0.2 mm between the T3 pad plates 811a, 811b and the T3 dry disc 79. The T3 calipers 812a and 812b are also fixedly secured to outside surface of the stanchion plate 99f by fastening bolts. As the T3 pistons 813a and 813b are pulled away from the T3 dry disc 79 by the elastic force from the sealing ring, there are no friction between the T3 pad plates 811a, 811b and the T3 dry disc 79. The high pressure oil from HCU 93 feeds into the cavities formed between the T3 hydraulic pistons 813a, 813b and the T3 calipers 812a, 812b through the seventh hydraulic circuit 815. The T3 hydraulic pistons 813a, 813b are operated by the fluid pressure, which drives the T3 pad plates 811a, 811b to fix the T3 dry disc 79.

There are two symmetrically arranged the T4 caliper brake systems 90. The T4 caliper brake systems 90 comprises a T4 dry disc 88, the T4 speed sensor 89 for watching state of the T4 dry disc 88, a T4 left pad plate 901a, a T4 right pad plate 901b, two pairs of independent hydraulic pistons 903a and 903b as well as a T4 calipers 902a and 902b. A plurality of speed teeth are uniformly processed on the circumferential surface of the T4 dry disc 88. There is a clearance about 2 mm between the T4 speed sensor 89 and the circumferential surface of the T4 dry disc 88. The T4 caliper brake system 90, as shown in FIGS. 1 to 3, the T4 left pad plate 901a and the T4 right pad plate 901b are pressed against the T4 dry disc 88 by two pairs of independent hydraulic piston 903a and 903b inside the T4 calipers 902a and 902b, respectively, connected in parallel to the same pressure source from the HCU 93 by using the eighth hydraulic circuit 905. There is a clearance about 0.2 mm between the T4 pad plates 901a, 901b and the T4 dry disc 88. The T4 calipers 902a and 902b are also fixedly secured to outside surface of the stanchion plate 99f by fastening bolts. As the T4 pistons 903a and 903b are pulled away from the T4 dry disc 88 by the elastic force from the sealing ring, there are no friction between the T4 pad plates 901a, 901b and the T4 dry disc 88. The high pressure oil from HCU 93 feeds into the cavities formed between the T4 hydraulic pistons 903a, 903b and the T4 calipers 902a, 902b through the eighth hydraulic circuit 905. The T4 hydraulic pistons 903a, 903b are operated by the fluid pressure, which drives the T4 pad plates 901a, 901b to fix the T4 dry disc 88.

Operation of the Exemplary Embodiment

The operator of the vehicle has three primary devices to control the hybrid transmission device 10. One of the primary control devices is a well-known drive range selector (not shown) that directs the ECU 92 to configure the hybrid transmission device 10 for either the park, reverse, neutral, or forward drive range. The second and third primary control devices constitute an accelerator pedal (not shown) and a brake pedal (also not shown). The information obtained by the ECU 92 from these three primary control sources will hereinafter be referred to as the "operator demand". The ECU 92 also obtains information from the engine 11, the first motor/generator, the second motor/generator, the states for the E0 dry disc 15, the M1 dry disc 19, the E1 dry disc 37, the M2 dry disc 41, the T1 dry disc 59, the T2 dry disc 64, the T3 dry disc 79, the T4 dry disc 88 and the vehicular axle 82, respectively, the HCU 93. In response to an operator's action, the ECU 92 determines what is required and then manipulates the selectively operated components of the hybrid transmission device 10 appropriately to respond to the operator demand.

For example, in the exemplary embodiment shown in FIG. 1, when the operator selects a drive range and manipulates either the accelerator pedal or the brake pedal, the ECU 92 thereby determines if the vehicle should accelerate or decelerate. The ECU 92 also monitors the state of the power sources, and determines the output speed from the hybrid transmission device 10 required to achieve the desired rate of acceleration or deceleration. Under the direction of the ECU 92, the hybrid transmission device 10 is capable of providing a range of output speeds from slow to fast in order to meet the acceleration and deceleration demands.

In order to provide a full explanation as to the operation of a hybrid transmission device embodying the concepts of the present invention, a description of the operational modes employed to achieve the output speeds necessary to meet the operator demand under various operating conditions shall be provided with respect to the embodiments. Those operating conditions are: whether the vehicle is to accelerate to, or hold, a desired speed; whether the vehicle is to decelerate; whether the vehicle is to reverse. As such, the ECU 92 constantly reads the operator demand in conjunction with the other information that expresses the operational state of the vehicle, including the power sources, and responds accordingly. The following descriptions describe various operational states of the hybrid transmission device 10. Once the overall concept as to how this preferred embodiment operates is understood, those concepts shall likewise apply to the embodiments subsequently described herein.

As will become apparent as the detailed description proceeds, the hybrid transmission device 10 includes six planetary gear sets mechanically-operatively connected to an internal combustion engine and two motor/generators adapted to selectively transmit mechanical power to an output member through selective application of eight caliper brake systems. In other words, various driving modes are provided by changing the states of these caliper brake systems and the operating modes of the engine and the first and second motor/generators.

Those skilled in the art will appreciate that each of these various driving modes can be configured with the ECU 92 to provide a range of output speeds from relatively slow to relatively fast within the hybrid transmission device 10 of operation. There are twelve modes for the hybrid transmission device 10 that provides power to the vehicle, i.e. the engine driving mode (EDM), the first motor/generator driving mode (M1DM), the second motor/generator driving mode (M2DM), the engine and the first motor/generator combined driving mode (EM1DM), the engine and the first motor/generator combined driving mode (EM2DM), the engine and the first and second motor/generators combined driving mode (EM1M2DM), the first and second motor/generators combined driving mode (M1M2DM), the series driving mode (SDM), the reverse driving mode (RDM), the engine start driving mode (ESDM), the deceleration and regenerative driving mode (DRDM) and the parking mode (PM).

1. The Engine Driving Mode (EDM)

During this mode, the power supplied by the hybrid transmission device 10 is predicated solely by the power delivered to the hybrid transmission device 10 from the engine 11. The ECU 92 controls the HCU 93 to disengage the E0 and E1 caliper brake systems and engage the M1 and M2 caliper brake systems, respectively. The first and second motor/generators are off. There are no any pressure is used to push the E0 hydraulic pistons 173a, 173b and the E1 hydraulic pistons 383a, 383b to move forward. The clearance is kept up between the E0 pad plates 171a, 171b and the E0 dry disc 15. The clearance is also kept up between the E1 pad plates 381a, 381b and the E1 dry disc 37. There are setting pressure is used to push the M1 hydraulic pistons 183a, 183b and the M2 hydraulic pistons 433a, 433b to move the M1 pad plates 181a, 181b and the M2 pad plates 431a, 431b braking the M1 dry disc 19 and the M2 dry disc 41, respectively. At the same time, there are four driving modes for the EDM, i.e. the first ratio for the EDM, the second ratio for the EDM, the third ratio for the EDM and the fourth ratio for the EDM.

Because the first motor/generator shaft 22 is fixedly connected to the M1 dry disc 19 and the first sun gear 25, the M1 dry disc 19 is broken, so the first sun gear 25 is locked. Because the second motor/generator shaft 40 is fixedly connected to the M2 dry disc 41 and the second sun gear 30, the M2 dry disc 41 is broken, so the second sun gear 30 is locked. Because the E1 shift gear shaft 36 which is fixedly secured to the E1 dry disc 37, and the E1 gear 35 is fixedly secured to the E1 shift gear shaft 36 and meshingly engages the first gear 29, so the first ring gear 27 and the second ring gear 32 are not locked.

The torque delivery path for the EDM includes the first carrier 28, which is driven by the engine 11 through the input member 14, the plurality of first planet gears 26, the first sun gear 25 locked by the M1 caliper brake system which provides the torque reaction point for the first planetary gear set P1, the first ring gear 27 and the second ring gear 32, the plurality of second planet gears 31, the second sun gear 30 locked by the M2 caliper brake system which provides the torque reaction point for the second planetary gear set P2, the second carrier 33 transmits the power from the engine 11 to the third sun gear 48 and the fourth sun gear 53 through the middle shaft 34. To produce the four fixed speed ratios, there are four delivery paths obtained by selecting the T1, T2, T3 and T4 caliper brake systems to disengage and engage.

(i) The First Ratio for the EDM

To produce the first ratio for the EDM, i.e. the first speed ratio results when the T1 and T3 caliper systems are disengaged and the T2 and T4 caliper systems are engaged. When this occurs, the ECU 92 controls the HCU 93 to disengage the T1 and T3 caliper systems and engage the T2 and T4 caliper systems, respectively. There are no any pressure is used to push the T1 hydraulic pistons 583a, 583b and the T3 hydraulic pistons 813a, 813b to move forward. The clearance is kept up between the T1 pad plates 581a, 581b and the T1 dry disc 59. The clearance is also kept up between the T3 pad plates 811a, 811b and the T3 dry disc 79. There are setting pressure is used to push the T2 hydraulic pistons 663a, 663b and the T4 hydraulic pistons 903a, 903b to move the T2 pad plates 661a, 661b and the T4 pad plates 901a, 901b braking the T2 dry disc 64 and the T4 dry disc 88, respectively.

The fourth sun gear 53 transmits the power from the middle shaft 34 to the fourth carrier 55 through the plurality of fourth planet gears 54. In this case, because the T2 shift gear shaft 63 which is fixedly secured to the T2 dry disc 64, and the T2 gear 62 is fixedly secured to the T2 shift gear shaft 63 and meshingly engages the fourth ring gear 52, so the fourth ring gear 52 is locked which provides the torque reaction point for the fourth planetary gear set P4. The sixth sun gear 72 transmits the power from the fourth carrier 55 to the sixth carrier 76 through the plurality of sixth planet gears 73. In this case, because the T4 shift gear shaft 86 which is fixedly secured to the T4 dry disc 88, and the T4 gear 85 is fixedly secured to the T4 shift gear shaft 86 and meshingly engages the third gear 75, so the fifth ring gear 70 and the sixth ring gear 74 are locked which provide the torque reaction point for the sixth planetary gear set P6. The third ring gear 50 and the fifth sun gear 68 drive the T1 dry disc 59 and the T3 dry disc 79 to freely rotatably around the T1 shift gear shaft 57 and the T3 shift gear shaft 78 without friction, respectively. The sixth carrier 76 drives the differential assembly 91 by the vehicular axle 82 to transmit the power to the side shafts 95, 96 and the wheel 97, 98.

Based on size constrains and the planetary gear sets, which are well known in the art, the relationship between the engine 11 rotational speed and the vehicular axle 82 rotational speed through the first fixed speed ratio of the hybrid transmission device 10 are selected based on gear teeth ratios:

$$No = \left(\frac{Z1 + Z2}{Z2}\right)\left(\frac{Z4}{Z3 + Z4}\right)\left(\frac{Z7}{Z7 + Z8}\right)\left(\frac{Z11}{Z11 + Z12}\right)Ne$$

Where:
Z1 is the number of gear teeth of the first sun gear 25.
Z2 is the number of gear teeth of the first ring gear 27.
Z3 is the number of gear teeth of the second sun gear 30.
Z4 is the number of gear teeth of the second ring gear 32.
Z5 is the number of gear teeth of the third sun gear 48.
Z6 is the number of gear teeth of the third ring gear 50.
Z7 is the number of gear teeth of the fourth sun gear 53.
Z8 is the number of gear teeth of the fourth ring gear 52.
Z9 is the number of gear teeth of the fifth sun gear 68.
Z10 is the number of gear teeth of the fifth ring gear 70.
Z11 is the number of gear teeth of the sixth sun gear 72.
Z12 is the number of gear teeth of the sixth ring gear 74.
Ne is the rotational speed of the engine 11.
N1 is the rotational speed of the first motor/generator rotor 23.
N2 is the rotational speed of the second motor/generator rotor 46.
No is the rotational speed of the vehicular axle 82.

These symbols are used in the present invention, except for special instruction.

(ii) The Second Ratio for the EDM

To produce the second ratio for the EDM, i.e. the second speed ratio results when the T2 and T3 caliper systems are disengaged and the T1 and T4 caliper systems are engaged. When this occurs, the ECU 92 controls the HCU 93 to disengage the T2 and T3 caliper systems and engage the T1 and T4 caliper systems, respectively. There are no any pressure is used to push the T2 hydraulic pistons 663a, 663b and the T3 hydraulic pistons 813a, 813b to move forward. The clearance is kept up between the T2 pad plates 661a, 661b and the T2 dry disc 64. The clearance is also kept up between the T3 pad plates 811a, 811b and the T3 dry disc 79. There are setting pressure is used to push the T1 hydraulic pistons 583a, 583b and the T4 hydraulic pistons 903a, 903b to move the T1 pad plates 581a, 581b and the T4 pad plates 901a, 901b braking the T1 dry disc 59 and the T4 dry disc 88, respectively.

The third sun gear 48 and the fourth sun gear 53 transmits the power from the middle shaft 34 to the fourth carrier 55 through the plurality of third planet gears 49 and the plurality of fourth planet gears 54. In this case, because the T1 shift gear shaft 57 which is fixedly secured to the T1 dry disc 59, and the T1 gear 56 is fixedly secured to the T1 shift gear shaft 57 and meshingly engages the third ring gear 50, so the third ring gear 50 is locked which provides the torque reaction point for the third planetary gear set P3. The sixth sun gear 72 transmits the power from the fourth carrier 55 to the sixth carrier 76 through the plurality of sixth planet gears 73. In this case, because the T4 shift gear shaft 86 which is fixedly secured to the T4 dry disc 88, and the T4 gear 85 is fixedly secured to the T4 shift gear shaft 86 and meshingly engages the third gear 75, so the fifth ring gear 70 and the sixth ring gear 74 are locked which provide the torque reaction point for the sixth planetary gear set P6. The fourth ring gear 52 and the fifth sun gear 68 drive the T2 dry disc 64 and the T3 dry disc 79 to freely rotatably around the T2 shift gear shaft 63 and the T3 shift gear shaft 78 without friction, respectively. The sixth carrier 76 drives the differential assembly 91 by the vehicular axle 82 to transmit the power to the side shafts 95, 96 and the wheel 97, 98.

Based on size constrains and the planetary gear sets, which are well known in the art, the relationship between the engine 11 rotational speed and the vehicular axle 82 rotational speed through the second fixed speed ratio of the hybrid transmission device 10 are selected based on gear teeth ratios:

$$No = \left(\frac{Z1 + Z2}{Z2}\right)\left(\frac{Z4}{Z3 + Z4}\right)\left(\frac{Z5Z7 + Z6Z7 + Z5Z8}{(Z5 + Z6)(Z7 + Z8)}\right)\left(\frac{Z11}{Z11 + Z12}\right)Ne$$

(iii) The Third Ratio for the EDM

To produce the third ratio for the EDM, i.e. the third speed ratio results when the T1 and T4 caliper systems are disengaged and the T2 and T3 caliper systems are engaged. When this occurs, the ECU 92 controls the HCU 93 to disengage the T1 and T4 caliper systems and engage the T2 and T3 caliper systems, respectively. There are no any pressure is used to push the T1 hydraulic pistons 583a, 583b and the T4 hydraulic pistons 903a, 903b to move forward. The clearance is kept up between the T1 pad plates 581a, 581b and the T1 dry disc 59. The clearance is also kept up between the T4 pad plates 901a, 901b and the T4 dry disc 88. There are setting pressure is used to push the T2 hydraulic pistons 663a, 663b and the T3 hydraulic pistons 813a, 813b to move the T2 pad plates 661a, 661b and the T3 pad plates 811a, 811b braking the T2 dry disc 64 and the T3 dry disc 79, respectively.

The fourth sun gear 53 transmits the power from the middle shaft 34 to the fourth carrier 55 through the plurality of fourth planet gears 54. In this case, because the T2 shift gear shaft 63 which is fixedly secured to the T2 dry disc 64, and the T2 gear 62 is fixedly secured to the T2 shift gear shaft 63 and meshingly engages the fourth ring gear 52, so the fourth ring gear 52 is locked which provides the torque reaction point for the fourth planetary gear set P4. The fifth carrier 71 and the sixth sun gear 72 transmit the power from the fourth carrier 55 to the sixth carrier 76 through the plurality of fifth planet gears 69 and the plurality of sixth planet gears 73. In this case, because the T3 shift gear shaft 78 which is fixedly secured to the T3 dry disc 79, and the T3 gear 77 is fixedly secured to the T3 shift gear shaft 78 and meshingly engages the second gear 67, so the second gear 67 and the fifth sun gear 68 are locked which provide the torque reaction point for the fifth planetary gear set P5. The third ring gear 50 and the third gear 75 drive the T1 dry disc 59 and the T4 dry disc 88 to freely rotatably around the T1 shift gear shaft 57 and the T4 shift gear shaft 86 without friction, respectively. The sixth carrier 76 drives the differential assembly 91 by the vehicular axle 82 to transmit the power to the side shafts 95, 96 and the wheel 97, 98.

Based on size constrains and the planetary gear sets, which are well known in the art, the relationship between the engine 11 rotational speed and the vehicular axle 82 rotational speed through the third fixed speed ratio of the hybrid transmission device 10 are selected based on gear teeth ratios:

$$No = \left(\frac{Z1+Z2}{Z2}\right)\left(\frac{Z4}{Z3+Z4}\right)\left(\frac{Z7}{Z7+Z8}\right)\left(\frac{Z10Z11+Z12(Z9+Z10)}{Z10(Z11+Z12)}\right)Ne$$

(iv) The Fourth Ratio for the EDM

To produce the fourth ratio for the EDM, i.e. the fourth speed ratio results when the T2 and T4 caliper systems are disengaged and the T1 and T3 caliper systems are engaged. When this occurs, the ECU 92 controls the HCU 93 to disengage the T2 and T4 caliper systems and engage the T1 and T3 caliper systems, respectively. There are no any pressure is used to push the T2 hydraulic pistons 663a, 663b and the T4 hydraulic pistons 903a, 903b to move forward. The clearance is kept up between the T2 pad plates 661a, 661b and the T2 dry disc 64. The clearance is also kept up between the T4 pad plates 901a, 901b and the T4 dry disc 88. There are setting pressure is used to push the T1 hydraulic pistons 583a, 583b and t the T3 hydraulic pistons 813a, 813b to move the T1 pad plates 581a, 581b and the T3 pad plates 811a, 811b braking the T1 dry disc 59 and the T3 dry disc 79, respectively.

The third sun gear 48 and the fourth sun gear 53 transmits the power from the middle shaft 34 to the fourth carrier 55 through the plurality of third planet gears 49 and the plurality of fourth planet gears 54. In this case, because the T1 shift gear shaft 57 which is fixedly secured to the T1 dry disc 59, and the T1 gear 56 is fixedly secured to the T1 shift gear shaft 57 and meshingly engages the third ring gear 50, so the third ring gear 50 is locked which provides the torque reaction point for the third planetary gear set P3. The fifth carrier 71 and the sixth sun gear 72 transmit the power from the fourth carrier 55 to the sixth carrier 76 through the plurality of fifth planet gears 69 and the plurality of sixth planet gears 73. In this case, because the T3 shift gear shaft 78 which is fixedly secured to the T3 dry disc 79, and the T3 gear 77 is fixedly secured to the T3 shift gear shaft 78 and meshingly engages the second gear 67, so the second gear 67 and the fifth sun gear 68 are locked which provide the torque reaction point for the fifth planetary gear set P5. The fourth ring gear 52 and the third gear 75 drive the T2 dry disc 64 and the T4 dry disc 88 to freely rotatably around the T2 shift gear shaft 63 and the T4 shift gear shaft 86 without friction, respectively. The sixth carrier 76 drives the differential assembly 91 by the vehicular axle 82 to transmit the power to the side shafts 95, 96 and the wheel 97, 98.

Based on size constrains and the planetary gear sets, which are well known in the art, the relationship between the engine 11 rotational speed and the vehicular axle 82 rotational speed through the fourth fixed speed ratio of the hybrid transmission device 10 are selected based on gear teeth ratios:

$$No = \left(\frac{Z1+Z2}{Z2}\right)\left(\frac{Z4}{Z3+Z4}\right)\left(\frac{Z5Z7+Z6Z7+Z5Z8}{(Z5+Z6)(Z7+Z8)}\right)\left(\frac{Z10Z11+Z12(Z9+Z10)}{Z10(Z11+Z12)}\right)Ne$$

2. The First Motor/Generator Driving Mode (M1DM)

During this mode, the power supplied by the hybrid transmission device 10 is predicated solely by the power delivered to the hybrid transmission device 10 from the first motor/generator. The first motor/generator operates as a motor during the mode. The ECU 92 controls the HCU 93 to disengage the E1 and M1 caliper brake systems and engage the E0 and M2 caliper brake systems, respectively. The engine 11 is closed. There are no any pressure is used to push the E1 hydraulic pistons 383a, 383b and the M1 hydraulic pistons 183a, 183b to move forward. The clearance is kept up between the E1 pad plates 381a, 381b and the E1 dry disc 37. The clearance is also kept up between the M1 pad plates 181a, 181b and the M1 dry disc 19. There are setting pressure is used to push the E0 hydraulic pistons 173a, 173b and the M2 hydraulic pistons 433a, 433b to move the E0 pad plates 171a, 171b and the M2 pad plates 431a, 431b braking the E0 dry disc 15 and the M2 dry disc 41, respectively. At the same time, there are four driving modes for the M1DM, i.e. the first ratio for the M1EDM, the second ratio for the M1EDM, the third ratio for the M1EDM and the fourth ratio for the M1EDM.

Because the first motor/generator shaft 22 is fixedly connected to the M1 dry disc 19 and the first sun gear 25, the M1 dry disc 19 is freely rotatably around the first motor/generator shaft 22, so the first sun gear 25 is not locked. Because the second motor/generator shaft 40 is fixedly connected to the M2 dry disc 41 and the second sun gear 30, the M2 dry disc 41 is broken, so the second sun gear 30 is locked. Because the input member 14 which is fixedly secured to the E0 dry disc 15, the E0 dry disc 15 is locked, and the first carrier 28 is fixedly secured to the input member 14, so the first carrier 28 is locked.

The torque delivery path for the M1DM includes the first sun gear 25, which is driven by the first motor/generator through the first motor/generator shaft 22, the plurality of first planet gears 26, the first carrier 28 locked by the E0 caliper brake system 17 which provides the torque reaction point for the first planetary gear set P1, the first ring gear 27 and the second ring gear 32, the plurality of second planet gears 31, the second sun gear 30 locked by the M2 caliper brake system which provides the torque reaction point for the second planetary gear set P2, the second carrier 33 transmits the power from the first motor/generator to the third sun gear 48 and the fourth sun gear 53 through the middle shaft 34. To produce the four fixed speed ratios, there are four delivery paths obtained by selecting the T1, T2, T3 and T4 caliper brake systems to disengage and engage.

(i) The First Ratio for the M1DM

According to the first ratio for the EDM and based on size constrains and the planetary gear sets, which are well known in the art, the relationship between the first motor/generator shaft 22 rotational speed and the vehicular axle 82 rotational speed through the first fixed speed ratio of the hybrid transmission device 10 are selected based on gear teeth ratios:

$$No = -\left(\frac{Z1}{Z2}\right)\left(\frac{Z4}{Z3+Z4}\right)\left(\frac{Z7}{Z7+Z8}\right)\left(\frac{Z11}{Z11+Z12}\right)N1$$

Where: the minus "–" sign indicates that the first motor/generator shaft 22 and the vehicular axle 82 rotate in the opposite direction.

(ii) The Second Ratio for the M1DM

According to the second ratio for the EDM and based on size constrains and the planetary gear sets, which are well known in the art, the relationship between the first motor/generator shaft 22 rotational speed and the vehicular axle 82 rotational speed through the second fixed speed ratio of the hybrid transmission device 10 are selected based on gear teeth ratios:

$$No = -\left(\frac{Z1}{Z2}\right)\left(\frac{Z4}{Z3+Z4}\right)\left(\frac{Z5Z7+Z6Z7+Z5Z8}{(Z5+Z6)(Z7+Z8)}\right)\left(\frac{Z11}{Z11+Z12}\right)N1$$

Where: the minus "−" sign indicates that the first motor/generator shaft 22 and the vehicular axle 82 rotate in the opposite direction.

(iii) The Third Ratio for the M1DM

According to the third ratio for the EDM and based on size constrains and the planetary gear sets, which are well known in the art, the relationship between the first motor/generator shaft 22 rotational speed and the vehicular axle 82 rotational speed through the second third speed ratio of the hybrid transmission device 10 are selected based on gear teeth ratios:

$$No = -\left(\frac{Z1}{Z2}\right)\left(\frac{Z4}{Z3+Z4}\right)\left(\frac{Z7}{Z7+Z8}\right)\left(\frac{Z10Z11+Z12(Z9+Z10)}{Z10(Z11+Z12)}\right)N1$$

Where: the minus "−" sign indicates that the first motor/generator shaft 22 and the vehicular axle 82 rotate in the opposite direction.

(iv) The Fourth Ratio for the M1DM

According to the fourth ratio for the EDM and based on size constrains and the planetary gear sets, which are well known in the art, the relationship between the first motor/generator shaft 22 rotational speed and the vehicular axle 82 rotational speed through the second fourth speed ratio of the hybrid transmission device 10 are selected based on gear teeth ratios:

$$No = -\left(\frac{Z1}{Z2}\right)\left(\frac{Z4}{Z3+Z4}\right)\left(\frac{Z5Z7+Z6Z7+Z5Z8}{(Z5+Z6)(Z7+Z8)}\right)\left(\frac{Z10Z11+Z12(Z9+Z10)}{Z10(Z11+Z12)}\right)N1$$

Where: the minus "−" sign indicates that the first motor/generator shaft 22 and the vehicular axle 82 rotate in the opposite direction.

3. The Second Motor/Generator Driving Mode (M2DM)

During this mode, the power supplied by the hybrid transmission device 10 is predicated solely by the power delivered to the hybrid transmission device 10 from the second motor/generator. The second motor/generator operates as a motor during the mode. The ECU 92 controls the HCU 93 to disengage the E0, M1 and M2 caliper brake systems and engage the E1 caliper brake system, respectively. The engine 11 is closed. There are no any pressure is used to push the E0 hydraulic pistons 173a, 173b, the M1 hydraulic pistons 183a, 183b and the M2 hydraulic pistons 433a, 433b to move forward. The clearance is kept up between the E0 pad plates 171a, 171b and the E0 dry disc 15. The clearance is also kept up between the M1 pad plates 181a, 181b and the M1 dry disc 19. The clearance is also kept up between the M2 pad plates 431a, 431b and the M2 dry disc 41. There are setting pressure is used to push the E1 hydraulic pistons 383a, 383b to move the E1 pad plates 381a, 381b braking the E1 dry disc 37. At the same time, there are four driving modes for the M2DM, i.e. the first ratio for the M2EDM, the second ratio for the M2EDM, the third ratio for the M2EDM and the fourth ratio for the M2EDM.

Because the first motor/generator shaft 22 is fixedly connected to the M1 dry disc 19 and the first sun gear 25, the M1 dry disc 19 is freely rotatably around the first motor/generator shaft 22, so the first sun gear 25 is not locked. Because the input member 14 is fixedly connected to the E0 dry disc 15 and the first carrier 28, the E0 dry disc 15 is freely rotatably around the input member 14, so the first carrier 28 is not locked. Because the E1 shift gear shaft 36 which is fixedly secured to the E1 dry disc 37, and the E1 gear 36 is fixedly secured to the E1 shift gear shaft 36 and meshingly engages the first gear 29, so the first gear 29 is locked which provides the torque reaction point for the first planetary gear set P1 and the second planetary gear set P2.

The torque delivery path for the M2DM includes the second sun gear 30, which is driven by the second motor/generator through the second motor/generator shaft 40, the plurality of second planet gears 31, the first gear 29 locked by the E1 caliper brake system which provides the torque reaction point for the second planetary gear set P2, the second carrier 33 transmits the power from the second motor/generator to the third sun gear 48 and the fourth sun gear 53 through the middle shaft 34. To produce the four fixed speed ratios, there are four delivery paths obtained by selecting the T1, T2, T3 and T4 caliper brake systems to disengage and engage.

(i) The First Ratio for the M2DM

According to the first ratio for the EDM and based on size constrains and the planetary gear sets, which are well known in the art, the relationship between the second motor/generator shaft 40 rotational speed and the vehicular axle 82 rotational speed through the first fixed speed ratio of the hybrid transmission device 10 are selected based on gear teeth ratios:

$$No = \left(\frac{Z3}{Z3+Z4}\right)\left(\frac{Z7}{Z7+Z8}\right)\left(\frac{Z11}{Z11+Z12}\right)N2$$

(ii) The Second Ratio for the M2DM

According to the second ratio for the EDM and based on size constrains and the planetary gear sets, which are well known in the art, the relationship between the second motor/generator shaft 40 rotational speed and the vehicular axle 82 rotational speed through the second fixed speed ratio of the hybrid transmission device 10 are selected based on gear teeth ratios:

$$No = \left(\frac{Z3}{Z3+Z4}\right)\left(\frac{Z5Z7+Z6Z7+Z5Z8}{(Z5+Z6)(Z7+Z8)}\right)\left(\frac{Z11}{Z11+Z12}\right)N2$$

(iii) The Third Ratio for the M2DM

According to the third ratio for the EDM and based on size constrains and the planetary gear sets, which are well known in the art, the relationship between the second motor/generator shaft 40 rotational speed and the vehicular axle 82 rotational speed through the third fixed speed ratio of the hybrid transmission device 10 are selected based on gear teeth ratios:

$$No = \left(\frac{Z3}{Z3+Z4}\right)\left(\frac{Z7}{Z7+Z8}\right)\left(\frac{Z10Z11+Z12(Z9+Z10)}{Z10(Z11+Z12)}\right)N2$$

(iv) The Fourth Ratio for the M2DM

According to the fourth ratio for the EDM and based on size constrains and the planetary gear sets, which are well known in the art, the relationship between the second motor/generator shaft 40 rotational speed and the vehicular axle 82 rotational speed through the fourth fixed speed ratio of the hybrid transmission device 10 are selected based on gear teeth ratios:

$$No = \left(\frac{Z3}{Z3+Z4}\right)\left(\frac{Z5Z7+Z6Z7+Z5Z8}{(Z5+Z6)(Z7+Z8)}\right)\left(\frac{Z10Z11+Z12(Z9+Z10)}{Z10(Z11+Z12)}\right)N2$$

4. The Engine and the First Motor/Generator Combined Driving Mode (EM1DM).

During this mode, the power supplied by the hybrid transmission device 10 is predicated by the power delivered to the hybrid transmission device 10 from both the engine 11 and the first motor/generator. The first motor/generator operates as a motor during the mode. The ECU 92 controls the HCU 93 to disengage the E0, M1 and E1 caliper brake systems and engage the M2 caliper brake system, respectively. The second motor/generator is closed. There are no any pressure is used to push the E0 hydraulic pistons 173a, 173b, the M1 hydraulic pistons 183a, 183b and the E1 hydraulic pistons 383a, 383b to move forward. The clearance is kept up between the E0 pad plates 171a, 171b and the E0 dry disc 15. The clearance is also kept up between the M1 pad plates 181a, 181b and the M1 dry disc 19. The clearance is also kept up between the E1 pad plates 381a, 381b and the E1 dry disc 37. There are setting pressure is used to push the M2 hydraulic pistons 433a, 433b to move the M2 pad plates 431a, 431b braking the M2 dry disc 41. At the same time, there are four driving modes for the EM1DM, i.e. the first ratio for the EM1DM, the second ratio for the EM1DM, the third ratio for the EM1DM and the fourth ratio for the EM1DM.

Because the first motor/generator shaft 22 is fixedly connected to the M1 dry disc 19 and the first sun gear 25, the M1 dry disc 19 is freely rotatably around the first motor/generator shaft 22, so the first sun gear 25 is not locked. Because the second motor/generator shaft 40 is fixedly connected to the M2 dry disc 41 and the second sun gear 30, the M2 dry disc 41 is locked, so the second sun gear 30 is locked.

The torque delivery path for the EM1DM includes the first carrier 28, which is driven by the engine 11 through the input member 14, the first sun gear 25, which is driven by the first motor/generator through the first motor/generator shaft 22, the power from the first carrier 28 and the first sun gear 25 is coupled by the plurality of first planet gears 26 and transmitted to the first ring gear 27 and the second ring gear 32, the plurality of second planet gears 31, the second sun gear 30 locked by the M2 caliper brake system which provides the torque reaction point for the second planetary gear set P2, the second carrier 33 transmits the power from the engine 11 and the first sun gear 25 to the third sun gear 48 and the fourth sun gear 53 through the middle shaft 34. To produce the four fixed speed ratios, there are four delivery paths obtained by selecting the T1, T2, T3 and T4 caliper brake systems to disengage and engage.

(i) The First Ratio for the EM1DM

According to the first ratio for the EDM and based on size constrains and the planetary gear sets, which are well known in the art, the relationship between the input member 14, the first motor/generator shaft 22 rotational speed and the vehicular axle 82 rotational speed through the first fixed speed ratio of the hybrid transmission device 10 are selected based on gear teeth ratios:

$$No = \left(\frac{Z1+Z2}{Z2}Ne - \frac{Z1}{Z2}N1\right)\left(\frac{Z4}{Z3+Z4}\right)\left(\frac{Z7}{Z7+Z8}\right)\left(\frac{Z11}{Z11+Z12}\right)$$

(ii) The Second Ratio for the EM1DM

According to the second ratio for the EDM and based on size constrains and the planetary gear sets, which are well known in the art, the relationship between the input member 14, the first motor/generator shaft 22 rotational speed and the vehicular axle 82 rotational speed through the second fixed speed ratio of the hybrid transmission device 10 are selected based on gear teeth ratios:

$$No = \left(\frac{Z1+Z2}{Z2}Ne - \frac{Z1}{Z2}N1\right)\left(\frac{Z4}{Z3+Z4}\right)\left(\frac{Z5Z7+Z6Z7+Z5Z8}{(Z5+Z6)(Z7+Z8)}\right)\left(\frac{Z11}{Z11+Z12}\right)$$

(iii) The Third Ratio for the EM1DM

According to the third ratio for the EDM and based on size constrains and the planetary gear sets, which are well known in the art, the relationship between the input member 14, the first motor/generator shaft 22 rotational speed and the vehicular axle 82 rotational speed through the third fixed speed ratio of the hybrid transmission device 10 are selected based on gear teeth ratios:

$$No = \left(\frac{Z1+Z2}{Z2}Ne - \frac{Z1}{Z2}N1\right)\left(\frac{Z4}{Z3+Z4}\right)\left(\frac{Z7}{Z7+Z8}\right)\left(\frac{Z10Z11+Z12(Z9+Z10)}{Z10(Z11+Z12)}\right)$$

(iv) The Fourth Ratio for the EM1DM

According to the fourth ratio for the EDM and based on size constrains and the planetary gear sets, which are well known in the art, the relationship between the input member 14, the first motor/generator shaft 22 rotational speed and the vehicular axle 82 rotational speed through the fourth fixed speed ratio of the hybrid transmission device 10 are selected based on gear teeth ratios:

$$No = \left(\frac{Z1+Z2}{Z2}Ne - \frac{Z1}{Z2}N1\right)\left(\frac{Z4}{Z3+Z4}\right)\\ \left(\frac{Z5Z7+Z6Z7+Z5Z8}{(Z5+Z6)(Z7+Z8)}\right)\left(\frac{Z10Z11+Z12(Z9+Z10)}{Z10(Z11+Z12)}\right)$$

5. The Engine and the Second Motor/Generator Combined Driving Mode (EM2DM).

During this mode, the power supplied by the hybrid transmission device 10 is predicated by the power delivered to the hybrid transmission device 10 from both the engine 11 and the second motor/generator. The second motor/generator operates as a motor during the mode. The ECU 92 controls the HCU 93 to disengage the E0, M2 and E1 caliper brake systems and engage the M1 caliper brake system, respectively. The first motor/generator is closed. There are no any pressure is used to push the E0 hydraulic pistons 173a, 173b, the M2 hydraulic pistons 433a, 433b and the E1 hydraulic pistons 383a, 383b to move forward. The clearance is kept up between the E0 pad plates 171*a*, 171*b* and the E0 dry disc 15. The clearance is also kept up between the M2 pad plates 431*a*, 431*b* and the M2 dry disc 41. The clearance is also kept up between the E1 pad plates 381*a*, 381*b* and the E1 dry disc 37. There are setting pressure is used to push the M1 hydraulic pistons 183*a*, 183*b* to move the M1 pad plates 181*a*, 181*b* braking the M1 dry disc 19. At the same time, there are four driving modes for the EM2DM, i.e. the first ratio for the EM2DM, the second ratio for the EM2DM, the third ratio for the EM2DM and the fourth ratio for the EM2DM.

Because the first motor/generator shaft 22 is fixedly connected to the M1 dry disc 19 and the first sun gear 25, the M1 dry disc 19 is locked, so the first sun gear 25 is locked.

The torque delivery path for the EM2DM includes the first carrier 28, which is driven by the engine 11 through the input member 14, the plurality of first planet gears 26, the first sun gear 25 locked by the M1 caliper brake system which provides the torque reaction point for the first planetary gear set P1, the first ring gear 27 and the second ring gear 32, the second sun gear 30 which is driven by the second motor/generator through the second motor/generator shaft 40, the power from the first carrier 28 and the second sun gear 30 is coupled by the plurality of second planet gears 31 and transmitted to the first ring gear 27 and the second carrier 33, the second carrier 33 transmits the power from the engine 11 and the second sun gear 30 to the third sun gear 48 and the fourth sun gear 53 through the middle shaft 34. To produce the four fixed speed ratios, there are four delivery paths obtained by selecting the T1, T2, T3 and T4 caliper brake systems to disengage and engage.

(i) The First Ratio for the M2DM

According to the first ratio for the EDM and based on size constrains and the planetary gear sets, which are well known in the art, the relationship between the input member 14, the second motor/generator shaft 40 rotational speed and the vehicular axle 82 rotational speed through the first fixed speed ratio of the hybrid transmission device 10 are selected based on gear teeth ratios:

$$No = \left(\frac{Z1+Z2}{Z2}Ne + \frac{Z3}{Z4}N2\right)\left(\frac{Z4}{Z3+Z4}\right)\left(\frac{Z7}{Z7+Z8}\right)\left(\frac{Z11}{Z11+Z12}\right)$$

(ii) The Second Ratio for the M2DM

According to the second ratio for the EDM and based on size constrains and the planetary gear sets, which are well known in the art, the relationship between the input member 14, the second motor/generator shaft 40 rotational speed and the vehicular axle 82 rotational speed through the second fixed speed ratio of the hybrid transmission device 10 are selected based on gear teeth ratios:

$$No = \left(\frac{Z1+Z2}{Z2}Ne + \frac{Z3}{Z4}N2\right)\left(\frac{Z4}{Z3+Z4}\right)\left(\frac{Z5Z7+Z6Z7+Z5Z8}{(Z5+Z6)(Z7+Z8)}\right)\left(\frac{Z11}{Z11+Z12}\right)$$

(iii) The Third Ratio for the M2DM

According to the third ratio for the EDM and based on size constrains and the planetary gear sets, which are well known in the art, the relationship between the input member 14, the second motor/generator shaft 40 rotational speed and the vehicular axle 82 rotational speed through the third fixed speed ratio of the hybrid transmission device 10 are selected based on gear teeth ratios:

$$No = \left(\frac{Z1+Z2}{Z2}Ne + \frac{Z3}{Z4}N2\right)\left(\frac{Z4}{Z3+Z4}\right)\left(\frac{Z7}{Z7+Z8}\right)\left(\frac{Z10Z11+Z12(Z9+Z10)}{Z10(Z11+Z12)}\right)$$

(iv) The fourth ratio for the M2DM.

According to the fourth ratio for the EDM and based on size constrains and the planetary gear sets, which are well known in the art, the relationship between the input member 14, the second motor/generator shaft 40 rotational speed and the vehicular axle 82 rotational speed through the fourth fixed speed ratio of the hybrid transmission device 10 are selected based on gear teeth ratios:

$$No = \left(\frac{Z1+Z2}{Z2}Ne + \frac{Z3}{Z4}N2\right)\left(\frac{Z4}{Z3+Z4}\right)\left(\frac{Z5Z7+Z6Z7+Z5Z8}{(Z5+Z6)(Z7+Z8)}\right)\left(\frac{Z10Z11+Z12(Z9+Z10)}{Z10(Z11+Z12)}\right)$$

6. The Engine and the First and Second Motor/Generators Combined Driving Mode (EM1M2DM).

During this mode, the power supplied by the hybrid transmission device 10 is predicated by the power delivered to the hybrid transmission device 10 from the engine 11, the first and second motor/generators. The first and second motor/generators operate as motor during the mode. The ECU 92 controls the HCU 93 to disengage the E0, M1, M2 and E1 caliper brake systems. There are no any pressure is used to push the E0 hydraulic pistons 173*a*, 173*b*, the M1 hydraulic pistons 183*a*, 183*b*, the M2 hydraulic pistons 433*a*, 433*b* and the E1 hydraulic pistons 383*a*, 383*b* to move forward. The clearance is kept up between the E0 pad plates 171*a*, 171*b* and the E0 dry disc 15. The clearance is also kept up between the M2 pad plates 431*a*, 431*b* and the M2 dry disc 41. The clearance is also kept up between the M1 pad plates 181*a*, 181*b* and the M1 dry disc 19. The clearance is also kept up between the E1 pad plates 381*a*, 381*b* and the E1 dry disc 37. At the same time, there are four driving modes for the EM1M2DM, i.e. the first ratio for the EM1M2DM, the second ratio for the EM1M2DM, the third ratio for the EM1M2DM and the fourth ratio for the EM1M2DM.

The torque delivery path for the EM1M2DM includes the first carrier 28, which is driven by the engine 11 through the input member 14, the first sun gear 25, which is driven by the first motor/generator through the first motor/generator shaft 22, the second sun gear 30 which is driven by the second motor/generator through the second motor/generator shaft 40, the power from the first carrier 28 and the first sun gear 25 is coupled by the plurality of first planet gears 26 and transmitted to the first ring gear 27 and the second ring gear 32, the power from the first ring gear 27 and the second ring gear 32 and the second sun gear 30 is coupled by the plurality of second planet gears 31 and transmitted to the second carrier 33, the second carrier 33 transmits the power from the engine 11, the first sun gear 25 and the second sun gear 30 to the third sun gear 48 and the fourth sun gear 53 through the middle shaft 34. To produce the four fixed speed ratios, there are four delivery paths obtained by selecting the T1, T2, T3 and T4 caliper brake systems to disengage and engage.

(i) The First Ratio for the EM1M2DM

According to the first ratio for the EDM and based on size constrains and the planetary gear sets, which are well known in the art, the relationship between the input member 14, the first motor/generator shaft 22 and the second motor/generator shaft 40 rotational speed and the vehicular axle 82 rotational speed through the first fixed speed ratio of the hybrid transmission device 10 are selected based on gear teeth ratios:

$$No = \left(\frac{Z1+Z2}{Z2}Ne + \frac{Z3}{Z4}N2 - \frac{Z1}{Z2}N1\right)\left(\frac{Z4}{Z3+Z4}\right)\left(\frac{Z7}{Z7+Z8}\right)\left(\frac{Z11}{Z11+Z12}\right)$$

(ii) The Second Ratio for the EM1M2DM

According to the second ratio for the EDM and based on size constrains and the planetary gear sets, which are well known in the art, the relationship between the input member 14, the first motor/generator shaft 22 and the second motor/generator shaft 40 rotational speed and the vehicular axle 82 rotational speed through the second fixed speed ratio of the hybrid transmission device 10 are selected based on gear teeth ratios:

$$No = \left(\frac{Z1+Z2}{Z2}Ne + \frac{Z3}{Z4}N2 - \frac{Z1}{Z2}N1\right)$$
$$\left(\frac{Z4}{Z3+Z4}\right)\left(\frac{Z5Z7+Z6Z7+Z5Z8}{(Z5+Z6)(Z7+Z8)}\right)\left(\frac{Z11}{Z11+Z12}\right)$$

(iii) The Third Ratio for the EM1M2DM

According to the third ratio for the EDM and based on size constrains and the planetary gear sets, which are well known in the art, the relationship between the input member 14, the first motor/generator shaft 22 and the second motor/generator shaft 40 rotational speed and the vehicular axle 82 rotational speed through the third fixed speed ratio of the hybrid transmission device 10 are selected based on gear teeth ratios:

$$No = \left(\frac{Z1+Z2}{Z2}Ne + \frac{Z3}{Z4}N2 - \frac{Z1}{Z2}N1\right)$$
$$\left(\frac{Z4}{Z3+Z4}\right)\left(\frac{Z7}{Z7+Z8}\right)\left(\frac{Z10Z11+Z12(Z9+Z10)}{Z10(Z11+Z12)}\right)$$

(iv) The Fourth Ratio for the EM1M2DM

According to the fourth ratio for the EDM and based on size constrains and the planetary gear sets, which are well known in the art, the relationship between the input member 14, the first motor/generator shaft 22 and the second motor/generator shaft 40 rotational speed and the vehicular axle 82 rotational speed through the fourth fixed speed ratio of the hybrid transmission device 10 are selected based on gear teeth ratios:

$$No = \left(\frac{Z1+Z2}{Z2}Ne + \frac{Z3}{Z4}N2 - \frac{Z1}{Z2}N1\right)\left(\frac{Z4}{Z3+Z4}\right)$$
$$\left(\frac{Z5Z7+Z6Z7+Z5Z8}{(Z5+Z6)(Z7+Z8)}\right)\left(\frac{Z10Z11+Z12(Z9+Z10)}{Z10(Z11+Z12)}\right)$$

7. The First and Second Motor/Generators Combined Driving Mode (M1M2DM).

During this mode, the power supplied by the hybrid transmission device 10 is predicated solely by the power delivered to the hybrid transmission device 10 from the first and second motor/generators. The first and second motor/generators operate as motor during the mode. The ECU 92 controls the HCU 93 to disengage the E1, M1 and M2 caliper brake systems and engage the E0 caliper brake system 17, respectively. The engine 11 is closed. There are no any pressure is used to push the E1 hydraulic pistons 383a, 383b and the M1 hydraulic pistons 183a, 183b and the M2 hydraulic pistons 433a, 433b to move forward. The clearance is kept up between the E1 pad plates 381a, 381b and the E1 dry disc 37. The clearance is also kept up between the M1 pad plates 181a, 181b and the M1 dry disc 19. The clearance is also kept up between the M2 pad plates 431a, 431b and the M2 dry disc 41. There are setting pressure is used to push the E0 hydraulic pistons 173a, 173b to move the E0 pad plates 171a, 171b braking the E0 dry disc 15. At the same time, there are four driving modes for the M1M2DM, i.e. the first ratio for the M1M2EDM, the second ratio for the M1M2EDM, the third ratio for the M1M2EDM and the fourth ratio for the M1M2EDM.

Because the input member 14 which is fixedly secured to the E0 dry disc 15, the E0 dry disc 15 is locked, and the first carrier 28 is fixedly secured to the input member 14, so the first carrier 28 is locked.

The torque delivery path for the M1DM includes the first sun gear 25, which is driven by the first motor/generator through the first motor/generator shaft 22, the plurality of first planet gears 26, the first carrier 28 locked by the E0 caliper brake system 17 which provides the torque reaction point for the first planetary gear set P1, the second sun gear 30 which is driven by the second motor/generator through the second motor/generator shaft 40, the power from the first ring gear 27 and the second ring gear 32 and the second sun gear 30 is coupled by the plurality of second planet gears 31 and transmitted to the second carrier 33, the second carrier 33 transmits the power from the first sun gear 25 and the second sun gear 30 to the third sun gear 48 and the fourth sun gear 53 through the middle shaft 34. To produce the four fixed speed ratios, there are four delivery paths obtained by selecting the T1, T2, T3 and T4 caliper brake systems to disengage and engage.

(i) The First Ratio for the M1M2DM

According to the first ratio for the EDM and based on size constrains and the planetary gear sets, which are well known in the art, the relationship between the first motor/generator shaft 22 and the second motor/generator shaft 40 rotational speed and the vehicular axle 82 rotational speed through the first fixed speed ratio of the hybrid transmission device 10 are selected based on gear teeth ratios:

$$No = \left(\frac{Z3}{Z4}N2 - \frac{Z1}{Z2}N1\right)\left(\frac{Z4}{Z3+Z4}\right)\left(\frac{Z7}{Z7+Z8}\right)\left(\frac{Z11}{Z11+Z12}\right)$$

(ii) The Second Ratio for the M1M2DM

According to the second ratio for the EDM and based on size constrains and the planetary gear sets, which are well known in the art, the relationship between the first motor/generator shaft 22 and the second motor/generator shaft 40 rotational speed and the vehicular axle 82 rotational speed through the second fixed speed ratio of the hybrid transmission device 10 are selected based on gear teeth ratios:

$$No = \left(\frac{Z3}{Z4}N2 - \frac{Z1}{Z2}N1\right)\left(\frac{Z4}{Z3+Z4}\right)\left(\frac{Z5Z7+Z6Z7+Z5Z8}{(Z5+Z6)(Z7+Z8)}\right)\left(\frac{Z11}{Z11+Z12}\right)$$

(iii) The Third Ratio for the M1M2DM

According to the third ratio for the EDM and based on size constrains and the planetary gear sets, which are well known in the art, the relationship between the first motor/generator shaft 22 and the second motor/generator shaft 40 rotational speed and the vehicular axle 82 rotational speed through the third fixed speed ratio of the hybrid transmission device 10 are selected based on gear teeth ratios:

$$No = \left(\frac{Z3}{Z4}N2 - \frac{Z1}{Z2}N1\right)\left(\frac{Z4}{Z3+Z4}\right)\left(\frac{Z7}{Z7+Z8}\right)\left(\frac{Z10Z11+Z12(Z9+Z10)}{Z10(Z11+Z12)}\right)$$

(iv) The Fourth Ratio for the EM1M2DM

According to the fourth ratio for the EDM and based on size constrains and the planetary gear sets, which are well known in the art, the relationship between the first motor/generator shaft 22 and the second motor/generator shaft 40 rotational speed and the vehicular axle 82 rotational speed through the fourth fixed speed ratio of the hybrid transmission device 10 are selected based on gear teeth ratios:

$$No = \left(\frac{Z3}{Z4}N2 - \frac{Z1}{Z2}N1\right)\left(\frac{Z4}{Z3+Z4}\right)$$
$$\left(\frac{Z5Z7+Z6Z7+Z5Z8}{(Z5+Z6)(Z7+Z8)}\right)\left(\frac{Z10Z11+Z12(Z9+Z10)}{Z10(Z11+Z12)}\right)8.$$

The series driving mode (SDM)

A series propulsion system is a system in which energy follows a path from an engine to an electric storage device and then to an electrical motor which applies power to rotate the drive members. There is no direct mechanical connection between the engine and the drive members in a series propulsion system. The transmission adapted to receive the output power from either an engine or an electric motor, or both, have heretofore relied largely on what has been designated as series, hybrid propulsion systems.

During this mode, the first motor/generator operates as a generator and the second motor/generator operates as a motor. The ECU 92 controls the HCU 93 to disengage the E0, M1 and M2 caliper brake systems and engage the E1 caliper brake system, respectively. There are no any pressure is used to push the E0 hydraulic pistons 173a, 173b and the M1 hydraulic pistons 183a, 183b and the M2 hydraulic pistons 433a, 433b to move forward. The clearance is kept up between the E0 pad plates 171a, 171b and the E0 dry disc 15. The clearance is also kept up between the M1 pad plates 181a, 181b and the M1 dry disc 19. The clearance is also kept up between the M2 pad plates 431a, 431b and the M2 dry disc 41. There are setting pressure is used to push the E1 hydraulic pistons 383a, 383b to move the E1 pad plates 381a, 381b braking the E1 dry disc 37.

Because the E1 shift gear shaft 36 which is fixedly secured to the E1 dry disc 37, and the E1 gear 36 is fixedly secured to the E1 shift gear shaft 36 and meshingly engages the first gear 29, so the first gear 29 is locked which provides the torque reaction point for the first planetary gear set P1 and the second planetary gear set P2.

The torque delivery path for the SDM includes the first carrier 28, which is driven by the engine 11 through the input member 14, the plurality of first planet gears 26, the first gear 29 locked by the E1 caliper brake system which provides the torque reaction point for the first planetary gear set P1 and the second planetary gear set P2, the second carrier 33 transmits the power from the engine 11 to the first motor/generator 23 through the first sun gear 25. The first motor/generator serves as a generator to produce power to charge the electric storage device 100 and drive the second motor/generator.

Based on size constrains and the planetary gear sets, which are well known in the art, the relationship between the input member 14 and the first motor/generator shaft 22 rotational speed of the hybrid transmission device 10 is selected based on gear teeth ratios:

$$N1 = \frac{Z1+Z2}{Z1}Ne$$

9. The Reverse Driving Mode (RDM)

The reverse mode of operation is effected by having the ECU 92 operate the second motor/generator as a motor, but reversing its rotational direction from the direction in which the second motor/generator rotates when the vehicle begins to move forwardly from a stationary position in the M2DM mode of operation.

10. The Engine Start Driving Mode (ESDM)

During this mode, the first motor/generator operates as a motor. The ECU 92 controls the HCU 93 to disengage the E0 and M1 caliper brake systems and engage the E1 caliper brake system, respectively. There are no any pressure is used to push the E0 hydraulic pistons 173a, 173b and the M1 hydraulic pistons 183a, 183b to move forward. The clearance is kept up between the E0 pad plates 171a, 171b and the E0 dry disc 15. The clearance is also kept up between the M1 pad plates 181a, 181b and the M1 dry disc 19. There are setting pressure is used to push the E1 hydraulic pistons 383a, 383b to move the E1 pad plates 381a, 381b braking the E1 dry disc 37.

Because the E1 shift gear shaft 36 which is fixedly secured to the E1 dry disc 37, and the E1 gear 36 is fixedly secured to the E1 shift gear shaft 36 and meshingly engages the first gear 29, so the first gear 29 is locked which provides the torque reaction point for the first planetary gear set P1 and the second planetary gear set P2. The first sun gear 25 is driven by the first motor/generator rotor 23 through the first motor/generator shaft 22. The first carrier 28 is driven by the first sun gear 25 through the plurality of first planet gears 26. The first carrier 28 drives the engine to the ignition start speed through the input member 14 by the transient torque damper 13.

11. The Deceleration and Regenerative Driving Mode (DRDM).

Under the condition that the three modes are selected, feed-back power is received from the side shafts 95, 96. The dynamic energy delivery path includes the side shafts 95, 96 drive the differential assembly 91 to transmit the dynamic energy to the hybrid transmission device 10. In the operating condition defined by having the dynamic energy of the moving vehicle fed back solely for the purpose of charging the electric storage device, and when the ECU 92 has determined that the operator desires to decelerate, the ECU 92 directs operation in the deceleration and regenerative for the first motor/generator driving mode (DRG1DM), the deceleration and regenerative for the second motor/generator driving mode DRG2DM and the deceleration and regenerative for the first and second motor/generators driving mode DRG1G2DM drive when the fed back speeds are in various speed range.

For operation in the DRG1DM, the ECU 92 operates the first motor/generator serves as a generator and selects the fixed speed ratio according to the specific speed range, and refers to the M1DM.

For operation in the DRG2DM, the ECU 92 operates the second motor/generator serves as a generator and selects the fixed speed ratio according to the specific speed range, and refers to the M2DM.

For operation in the DRG1G2DM, the ECU 92 operates the first and second motor/generators serve as generator and selects the fixed speed ratio according to the specific speed range, and refers to the M1M2DM.

12. The Parking Mode (PM).

The reverse mode of operation is effected by having the ECU 92 operate the HCU 93 to engage the T3 and T4 caliper brake systems, respectively. There are setting pressure is used to push the T3 hydraulic pistons 813a, 813b and the T4 hydraulic pistons 903a, 903b to move the T3 pad plates 811a, 811b and the T4 pad plates 901a, 901b braking the T3 dry disc 79 and the T4 dry disc 88, respectively.

In this case, because the T3 shift gear shaft 78 which is fixedly secured to the T3 dry disc 79, and the T3 gear 77 is fixedly secured to the T3 shift gear shaft 78 and meshingly engages the second gear 67, so the second gear 67 and the fifth sun gear 68 are locked which provide the torque reaction point for the fifth planetary gear set P5. In this case, because the T4 shift gear shaft 86 which is fixedly secured to the T4 dry disc 88, and the T4 gear 85 is fixedly secured to the T4 shift gear shaft 86 and meshingly engages the third gear 75, so the fifth ring gear 70 and the sixth ring gear 74 are locked which provide the torque reaction point for the sixth planetary gear set P6. Because the fifth sun gear 68 and the fifth ring 70 are simultaneously locked, so the fifth carrier 71 and the sixth sun gear 71 are locked. Because the sixth sun gear 71 and the sixth ring 74 are simultaneously locked, so the sixth carrier 76 is locked. Then the vehicle is in the parking mode.

The embodiments are highly preferred, of the present invention are disclosed, and it is to be clearly understood that the aforesaid embodiments are susceptible to numerous additional changes apparent to one skilled in the art. Therefore, the scope of the present invention is not to be limited to the details shown and described but is intended to include all changes and modifications which come within the scope of the appended claims.

As should now be apparent, the present invention teaches that a hybrid transmission device embodying the concepts of the present invention is capable of accomplishing the objects thereof.

What is claimed is:

1. A hybrid transmission device, comprising:
a central housing;
an input member for receiving power from an internal combustion engine;
an output member for delivering power from the transmission;
a first and second motor/generators;
an energy storage device for interchanging electrical power with said first and second motor/generators;
a control unit for regulating the electrical power interchange between the energy storage device and the first and second motor/generators and also for regulating electrical power interchange between the first and second motor/generators;
the first motor/generator comprises a first stator supported interiorly of the central housing and a first rotor fixed secured to a first motor/generator shaft;
the second motor/generator having a second stator supported interiorly of the central housing, a second rotor fixed secured to a second motor/generator shaft;
a first planetary gear set;
a second planetary gear set operably connected to the first planetary gear set;
a third planetary gear set;
a fourth planetary gear set operably connected to the third planetary gear set;
a fifth planetary gear set;
a sixth planetary gear set operably connected to the fifth planetary gear set;
the first planetary gear set, the second planetary gear set, the third planetary gear set, the fourth planetary gear set, the fifth planetary gear set and the sixth planetary gar set are coaxially aligned with each other;
the six coaxially aligned planetary gear sets, each planetary gear set utilizing sun gear, ring gear, a carrier and a plurality of planet gears;
the sun gear and ring gear in each planetary gear set meshingly engage a plurality of planet gears;
the input member is rotatably connected to a first carrier in the first planetary gear set for delivering power from said internal combustion engine;
the output member is rotatably connected to a sixth carrier in the sixth planetary gear set for delivering power from said hybrid transmission device;
the first and second motor/generators are coaxially aligned with each other and with the six planetary gear sets;
a first sun gear in the first planetary gear set connected to the first motor/generator rotor through the first motor/generator shaft;
a second sun gear in the second planetary gear set connected to the second motor/generator rotor through the second motor/generator shaft;
eight caliper brake systems;
four of the caliper brake systems are used to the first and second planetary gear sets;
another four of the caliper brake systems are used to the third, fourth, fifth and sixth planetary gear sets;
each caliper brake system comprises a dry disc, a speed sensor for watching state of the dry disc, a pair of pad plates, two pairs of independent hydraulic pistons and a pair of calipers;
a plurality of speed teeth processed on the circumferential surface of the dry disc;
the caliper brake systems are mounted on outside of the hybrid transmission device housing;
a hydraulic control unit communicates with the caliper brake systems by hydraulic circuits;
five pairs of shift gear systems;
each shift gear system comprises a shift gear, a shift shaft, a pair of spacing rings and a pair of bearings;
the shift gear is secured to the shift shaft; and
the dry disc is secured to the shift shaft.

2. The hybrid transmission device according to claim 1, wherein:
a first ring gear in the first planetary gear set connected to a second ring gear in the second planetary gear set through a first gear;
a third carrier in the third planetary gear set connected to a fourth ring gear in the fourth planetary gear set;
a fifth ring gear in the fifth planetary gear set connected to a sixth ring gear in the sixth planetary gear set through a third gear;

a second carrier in the second planetary gear set connected to a third sun gear in the third planetary gear set and a fourth sun gear in the fourth planetary gear set through a middle shaft;
a fifth carrier in the fifth planetary gear set connected to a sixth sun gear in the sixth planetary gear set;
a fifth sun gear in the fifth planetary gear set connected to a second gear.

3. The hybrid transmission device according to claim 2, wherein:
the eight caliper brake systems comprises E0 caliper brake system, M1 caliper brake system, E1 caliper brake system, M2 caliper brake system, T1 caliper brake system, T2 caliper brake system, T3 caliper brake system and T4 caliper brake system;
the E0 caliper brake system is used to control the input member locked and released;
the E1 caliper brake system is used to control the first gear locked and released;
the M1 caliper brake system is used to control the first motor/generator shaft locked and released;
the M2 caliper brake system is used to control the second motor/generator shaft locked and released;
the T1 caliper brake system is used to control a third ring gear in the third planetary gear set locked and released;
the T2 caliper brake system is used to control the fourth ring gear in the fourth planetary gear set locked and released;
the T3 caliper brake system is used to control the second gear locked and released;
the T4 caliper brake system is used to control the third gear locked and released.

4. The hybrid transmission device according to claim 2, wherein:
five pairs of shift gear systems comprises E1 shift gear systems, T1 shift gear systems, T2 shift gear systems, T3 shift gear systems and T4 shift gear systems;
the E1 shift gear systems symmetrically are arranged on the circumferential surface of the first gear and an E1 shift gear in the E1 shift gear systems meshingly engage the first gear;
the T1 shift gear systems symmetrically are arranged on the circumferential surface of a third ring gear in the third planetary gear set and a T1 shift gear in the T1 shift gear systems meshingly engage outer teeth of the third ring gear; the T2 shift gear systems symmetrically are arranged on the circumferential surface of the fourth ring gear in the fourth planetary gear set and a T2 shift gear in the T2 shift gear systems meshingly engage outer teeth of the fourth ring gear;
the T3 shift gear systems symmetrically are arranged on the circumferential surface of a second gear and a T3 shift gear in the T3 shift gear systems meshingly engage the second gear;
the T4 shift gear systems symmetrically are arranged on the circumferential surface of the third gear and the T4 shift gear in the T4 shift gear systems meshingly engage the third gear.

5. The hybrid transmission device according to claim 4, wherein:
the first gear has an outer tooth structure, which is mounted on the outer circumference of the whole ring formed by the first ring gear in the first planetary gear set and the second ring gear in the second planetary gear set;
the second gear has only an outer tooth structure, which is fixedly connected to the fifth sun gear;

the third gear has an outer tooth structure, which is mounted on the outer circumference of the whole ring formed by the fifth ring gear in the fifth planetary gear set and the sixth ring gear in the sixth planetary gear set.

6. The hybrid transmission device according to claim 3, wherein:
the M1 caliper brake system comprises a M1 dry disc, the M2 caliper brake system comprises a M2 dry disc, and the E0 caliper brake system comprises an E0 dry disc;
the first motor/generator shaft is fixedly secured to the M1 dry disc; the second motor/generator shaft is fixedly secured to the M2 dry disc 41; the input member is fixedly secured to the E0 dry disc.

7. The hybrid transmission device according to claim 3, wherein:
two of the T1, T2, T3 and T4 caliper brake systems selectively engage and disengage to lock and release gear members in the third, fourth, fifth and sixth planetary gear sets through the shift gear systems.

8. The hybrid transmission device according to claim 7, wherein:
the T2 and T4 caliper systems are engaged to selectively lock the fourth ring gear in the fourth planetary gear set and the third gear to effect operation a first fixed speed ratio of the hybrid transmission device.

9. The hybrid transmission device according to claim 7, wherein:
the T1 and T4 caliper brake systems are engaged to selectively lock the third ring gear in the third planetary gear set and the third gear to produce a second fixed speed ratio of the hybrid transmission device.

10. The hybrid transmission device according to claim 7, wherein:
the T2 and T3 caliper brake systems are engaged to selectively lock the fourth ring gear in the fourth planetary gear set and the second gear to produce a third speed ratio of the hybrid transmission device.

11. The hybrid transmission device according to claim 7, wherein:
the T1 and T3 caliper brake systems are engaged to selectively lock the third ring gear in said third planetary gear set and the second gear to produce a fourth speed ratio of the hybrid transmission device.

12. The hybrid transmission device according to claim 7, wherein:
the T3 and T4 caliper brake systems are engaged to selectively lock the second gear and the third gear to produce a parking mode of the hybrid transmission device.

13. The hybrid transmission device according to claim 3, wherein:
some of the E0, M1, E1 and M2 caliper brake systems selectively engage and disengage to lock and release gear members in the first and second planetary gear sets through the shift gear systems and said caliper brake systems.

14. The hybrid transmission device according to claim 12, wherein:
the M1 and M2 caliper brake are engaged to selectively lock the first sun gear in the first planetary gear set and the second sun gear in the second planetary gear to produce a engine driving mode of the hybrid transmission device.

15. The hybrid transmission device according to claim 13, wherein:
only the E1 caliper brake systems are engaged to selectively lock the first gear to produce a second motor/ generator driving mode or series driving mode or engine start driving mode of the hybrid transmission device.

16. The hybrid transmission device according to claim 13, wherein:
the E0 and M2 caliper brake systems are engaged to selectively lock the input member and the second sun gear in the second planetary gear to produce a first motor/generator driving mode of the hybrid transmission device.

17. The hybrid transmission device according to claim 13, wherein:
only the M2 caliper brake systems are engaged to selectively lock the second sun gear in the second planetary gear set to produce a engine and the first motor/generator combined driving mode of the hybrid transmission device.

18. The hybrid transmission device according to claim 13, wherein:
only the M1 caliper brake systems are engaged to selectively lock the first sun gear in the first planetary gear set to produce a engine and the second motor/generator combined driving mode of the hybrid transmission device.

19. The hybrid transmission device according to claim 13, wherein:
only the E0 caliper brake systems are engaged to selectively lock the input member to produce a first and the second motor/generator combined driving mode of the hybrid transmission device.

20. The hybrid transmission device according to claim 13, wherein:
all of the E0, M1, M2 and E1 caliper brake systems are disengaged to produce a engine and the first and the second motor/generator combined driving mode of the hybrid transmission device.

\* \* \* \* \*